(12) United States Patent
Nakajima

(10) Patent No.: US 8,270,018 B2
(45) Date of Patent: Sep. 18, 2012

(54) CANCELING A WORKFLOW FROM AN IMAGE PROCESSING APPARATUS

(75) Inventor: Satoru Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 918 days.

(21) Appl. No.: 12/354,071

(22) Filed: Jan. 15, 2009

(65) Prior Publication Data

US 2009/0195817 A1    Aug. 6, 2009

(30) Foreign Application Priority Data

Feb. 6, 2008    (JP) .................... 2008-026904

(51) Int. Cl.
*G06F 3/12* (2006.01)

(52) U.S. Cl. ..................................... 358/1.15

(58) Field of Classification Search .............. 358/1.15
See application file for complete search history.

(56) References Cited

U.S. PATENT DOCUMENTS

2004/0205376 A1    10/2004    Iida ................................ 714/4

FOREIGN PATENT DOCUMENTS

| JP | 2004-215029 A | 7/2004 |
| JP | 2004-288026 A | 10/2004 |
| JP | 2005-222284 A | 8/2005 |

*Primary Examiner* — Benny Q Tieu
*Assistant Examiner* — Eric A Rust
(74) *Attorney, Agent, or Firm* — Fitzpatrick, Cella, Harper & Scinto

(57) ABSTRACT

In a document processing system, whether processing of a workflow specified by a cancellation instruction is in execution is determined based on whether identification information of the workflow specified by the cancellation instruction coincides with that of a workflow associated with document data. When the processing of the workflow corresponding to the cancellation instruction is in execution, the processing of the workflow is canceled. When the processing of the workflow is not in execution and the contents of processing to be executed by another image forming apparatus are designated in a selected workflow, the cancellation instruction is transmitted to the other image forming apparatus specified based on the log information.

11 Claims, 19 Drawing Sheets

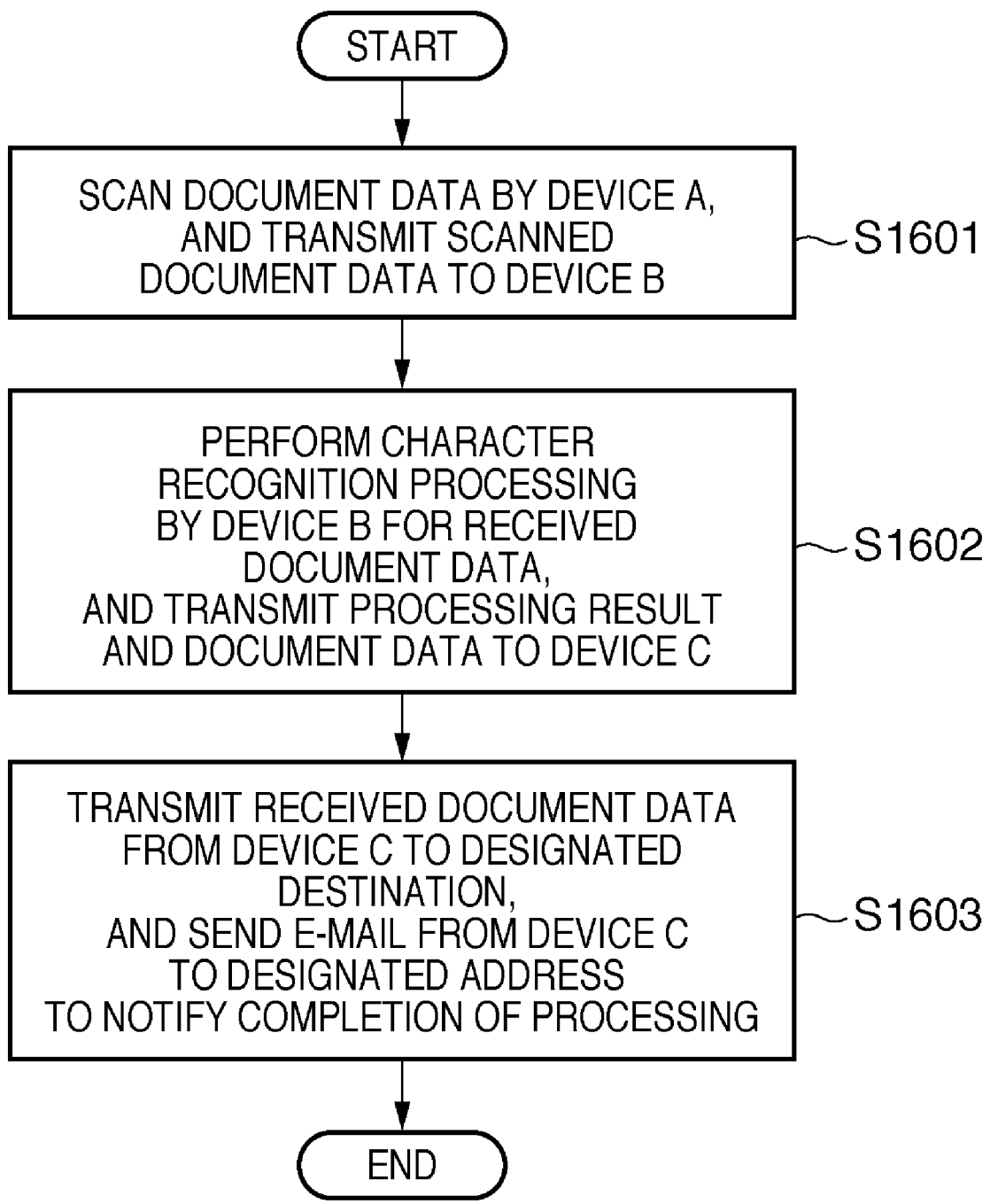

CANCELING A WORKFLOW FROM AN IMAGE PROCESSING APPARATUS

BACKGROUND OF THE INVENTION

1. Field of the Invention

The present invention relates to a document processing system and a control method of controlling the document processing system for performing document processing by transmitting/receiving document data between image forming apparatuses which are connected to a network and can communicate with each other.

2. Description of the Related Art

Recently, multi-function apparatuses (digital multi-function peripherals) which are based on a digital copying machine and have many functions have come into practical use. For example, the scanner, facsimile communication, and printer functions of a digital copying machine can be used in combination. There has also been proposed a system which implements processing (workflow) of document data by a plurality of digital multi-function peripherals connected to a network by using functions of a digital copying machine.

For example, in a workflow for approving an application form as document data, the applicant scans the application form and sends the data to an approver. Upon receiving the data, the approver executes approval processing and sends the data to the next approver. The final approver notifies the applicant of an approval, and saves the application form in a designated server or the like.

There is also a workflow for executing processing using different functions in respective devices. For example, a given device executes scanning and transmits the data to the next device. The receiving device executes image analysis processing such as OCR, and transmits the processing result to the next device. The receiving device outputs the data onto a paper medium or registers it in a server.

Japanese Patent Laid-Open No. 2004-215029 discloses an arrangement in which, when a change of settings associated with processing of document data is designated in executing the processing of the document data using a plurality of digital copying machines, a digital copying machine which executes the processing rejects the setting change designation.

Japanese Patent Laid-Open No. 2005-222284 discloses a service cooperation processing system in which, upon receiving cooperation information having given priority, processes are executed in the order of priority and the cooperation information is transmitted to the next service processing destination. In the service cooperation processing system, when the stop of processing is designated, new cooperation information for executing the stop processing with highest priority is generated and transmitted to a service processing destination to sequentially perform service stop processes.

However, to cancel ongoing processing of a job input to the system, the conventional system requires a server for centralizing a workflow. The server manages the execution status of processing in each device. When cancellation of processing is designated, the server instructs a device during execution of the processing to cancel the processing. In this case, the server needs to be separately arranged, so the construction and maintenance of the system require complicated work.

Also, even when the operator wants to stop only a specific workflow while processing of a plurality of workflows is in progress, the function of the device is stopped to stop the process of the workflow. As a result, the processes of all the workflows stop.

SUMMARY OF THE INVENTION

The present invention has been made to overcome the conventional drawbacks, and has as its object to provide a document processing technique capable of canceling a workflow without arranging a server for managing processing of document data.

It is another object of the present invention to provide a document processing technique capable of canceling only processing of document data to undergo a specific workflow without stopping all the functions of devices which execute workflows.

According to one aspect of the present invention, there is provided a document processing system in which a plurality of image forming apparatuses that are connected to a network and can communicate with each other transmit/receive document data to/from each other, and execute processing of document data in accordance with a workflow that defines contents of processes to be executed by the respective image forming apparatuses, each image forming apparatus comprising: an analysis unit adapted to analyze, for a workflow selected from a plurality of workflows stored in advance in a storage unit, a content of processing document data by the image forming apparatus and a content of processing document data by another image forming apparatus; a reception unit adapted to receive document data and store the document data in the storage unit; an association unit adapted to associate the workflow with the document data by combining identification information for identifying the selected workflow, and the document data; an execution unit adapted to execute processing based on an analysis result of the analysis unit for the document data; a transmission unit adapted to, when processing to be executed by another image forming apparatus is designated in the selected workflow as a result of analysis by the analysis unit, transmit the document data to the other image forming apparatus upon completion of processing the document data; an acceptance unit adapted to accept a cancellation instruction for specifying and canceling processing of a workflow; a determination unit adapted to determine, based on whether identification information of the workflow specified by the cancellation instruction coincides with identification information of the workflow associated with the document data stored in the storage unit, whether the processing of the workflow specified by the cancellation instruction is in execution by the execution unit; a cancellation processing unit adapted to, when the determination unit determines that the processing of the workflow corresponding to the cancellation instruction is in execution, cancel the processing of the workflow; and a log information management unit adapted to store, as log information in the storage unit, the document data transmitted by the transmission unit and information of the other image forming apparatus serving as a destination of the document data, wherein when the processing of the workflow is not in execution and the content of the processing to be executed by the other image forming apparatus is designated in the selected workflow, the cancellation processing unit transmits the cancellation instruction to the other image forming apparatus specified based on the log information.

According to another aspect of the present invention, there is provided a control method of controlling a document processing system in which a plurality of image forming apparatuses that are connected to a network and can communicate with each other transmit/receive document data to/from each other, and execute processing of document data in accordance with a workflow that defines contents of processes to be executed by the respective image forming apparatuses, the method comprising: an analysis step of analyzing, for a workflow selected from a plurality of workflows stored in advance in a storage unit, a content of processing document data by an image forming apparatus and a content of processing document data by another image forming apparatus; a reception step of receiving document data and storing the document data in the storage unit; an association step of associating the workflow with the document data by combining identification information for identifying the selected workflow, and the document data; an execution step of executing processing based on an analysis result of the analysis step for the document data; a transmission step of, when processing to be executed by another image forming apparatus is designated in the selected workflow as a result of analysis in the analysis step, transmitting the document data to the other image forming apparatus upon completion of processing the document data; an acceptance step of accepting a cancellation instruction for specifying and canceling processing of a workflow; a determination step of determining, based on whether identification information of the workflow specified by the cancellation instruction coincides with identification information of the workflow associated with the document data stored in the storage unit, whether the processing of the workflow specified by the cancellation instruction is in execution in the execution step; a cancellation processing step of, when the processing of the workflow corresponding to the cancellation instruction is determined in the determination step to be in execution, canceling the processing of the workflow; and a log information management step of storing, as log information in the storage unit, the document data transmitted in the transmission step and information of the other image forming apparatus serving as a destination of the document data, wherein in the cancellation processing step, when the processing of the workflow is not in execution and the content of the processing to be executed by the other image forming apparatus is designated in the selected workflow, the cancellation instruction is transmitted to the other image forming apparatus specified based on the log information.

The present invention can build a system capable of canceling a workflow without arranging a server for managing processing of document data. The present invention can, therefore, reduce the cost of building a system and the burden of maintenance.

Only processing of document data to undergo a specific workflow can be canceled without stopping all the functions of devices which execute workflows. Thus, a plurality of workflows can be parallel-processed.

Further features of the present invention will become apparent from the following description of exemplary embodiments with reference to the attached drawings.

BRIEF DESCRIPTION OF THE DRAWINGS

FIG. 16 is a flowchart for explaining the sequence of processes in respective devices in a document processing system formed from digital multi-function peripheral A (device A), digital multi-function peripheral B (device B), and digital multi-function peripheral C (device C) as an example of the system configuration;

DESCRIPTION OF THE EMBODIMENTS

Preferred embodiments of the present invention will be exemplified in detail below with reference to the accompanying drawings. Components set forth in these embodiments are merely examples, and the technical scope of the present invention should be determined by the scope of the appended claims and is not limited to the individual embodiments to be described below.

First Embodiment (System Configuration)

Figure 1:
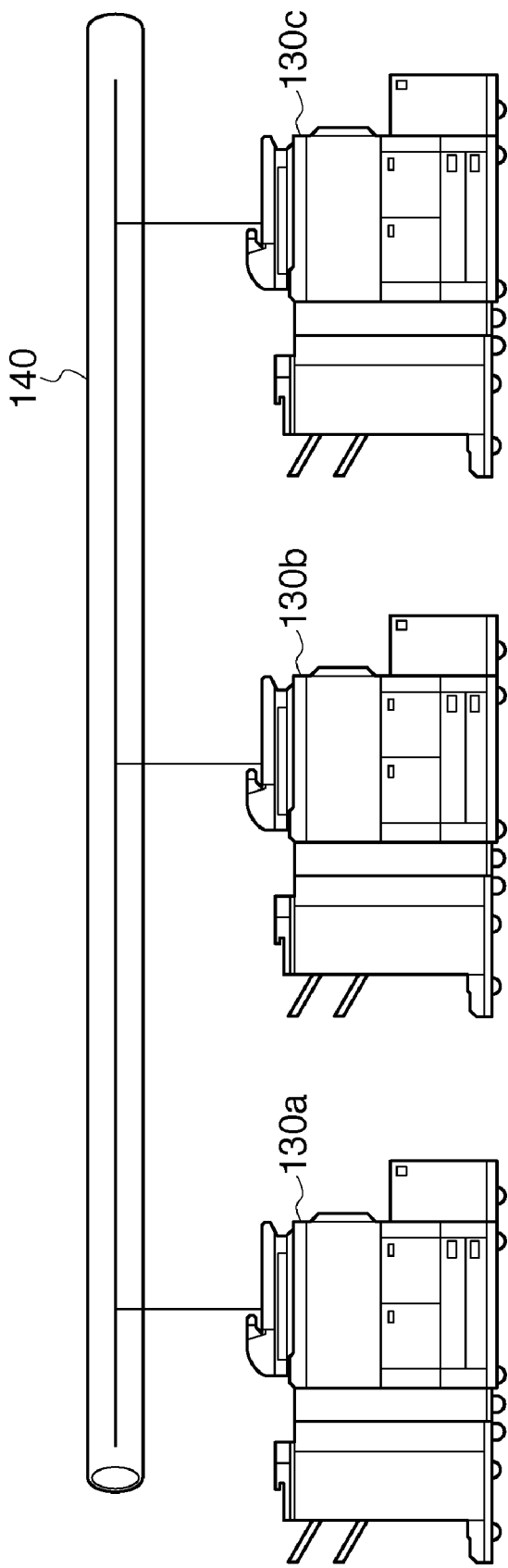
FIG. 1 is a view for explaining the overall configuration of a document processing system which executes a workflow according to an embodiment of the present invention.

FIG. 1 is a view for explaining the overall configuration of a document processing system (workflow system) which executes document processing (workflow) according to the embodiment of the present invention. In the document processing system, a plurality of image forming apparatuses which are connected to a network and can communicate with each other transmit/receive document data to/from each other. Each image forming apparatus executes processing of document data in accordance with a workflow which defines the contents of the processing. The document processing system (workflow system) includes a plurality of image forming apparatuses 130*a*, 130*b*, and 130*c* (to be referred to as digital multi-function peripherals 130 hereinafter). The digital multi-function peripherals 130 are connected to a network (LAN) 140, and can transmit/receive image information, device information, document data, and the like to/from each other. The document processing system according to the embodiment of the present invention can cancel processing of a workflow without arranging a server for managing processing of document data. Also, the document processing system can cancel only processing of document data to undergo a specific workflow without stopping all the functions of devices which execute workflows. Hence, a plurality of workflows can be parallel-processed.

Figure 2:
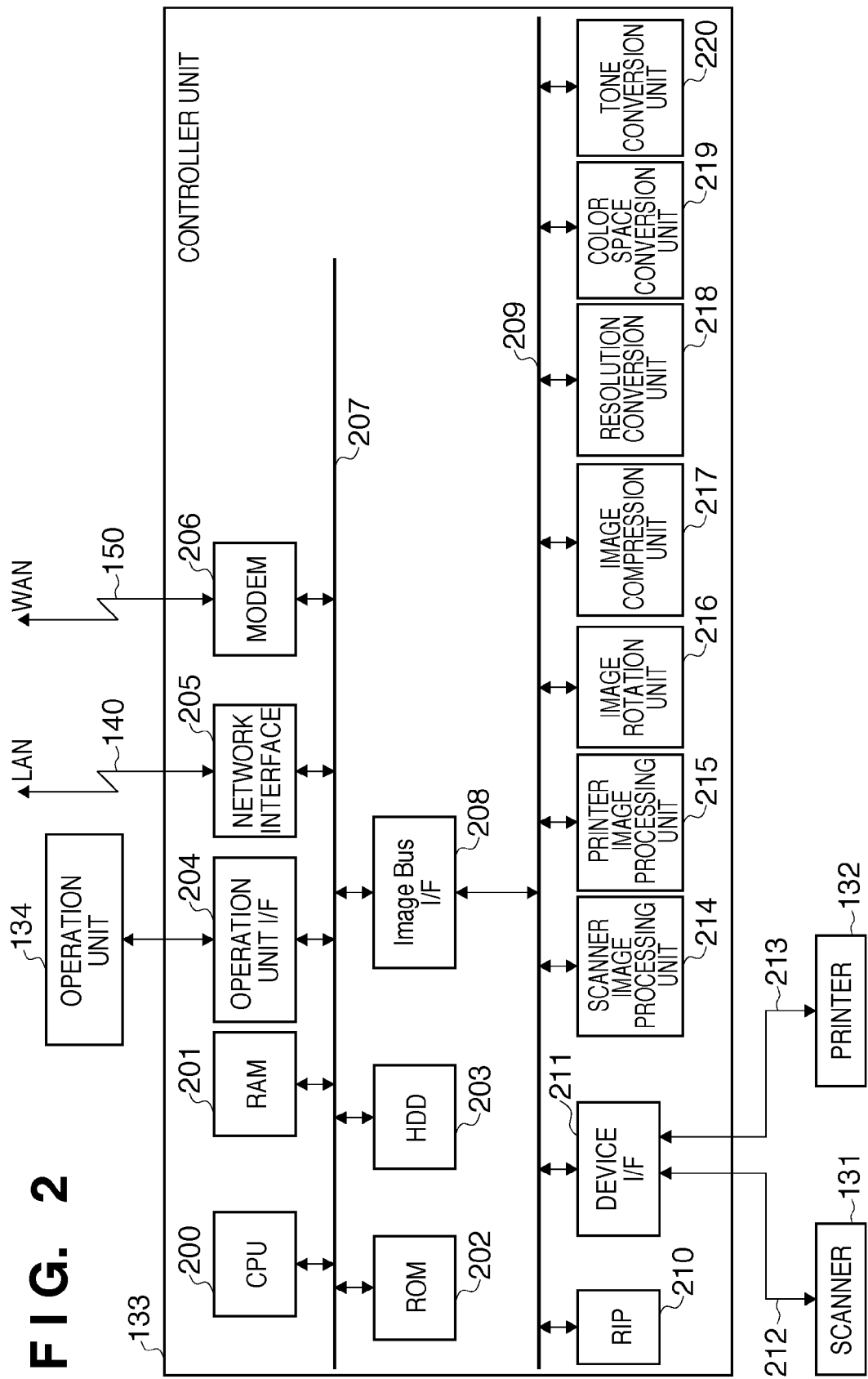
FIG. 2 is a block diagram for explaining the overall configuration of a digital multi-function peripheral.

FIG. 2 is a block diagram for explaining the overall configuration of the digital multi-function peripheral 130 shown in FIG. 1. A controller unit 133 is connected to a scanner 131 serving as an image input device, and a printer 132 serving as an image output device. The controller unit 133 is also connected to the network (LAN) 140 and a public line (WAN) 150. The controller unit 133 can input/output image information and device information.

In the controller unit 133, a CPU 200 controls the entire system. A RAM 201 serves as a system work memory for operating the CPU 200, and also as an image memory (buffer memory) for temporarily storing input image data. A ROM 202 is a boot ROM which stores the boot program of the system. A hard disk drive (HDD) 203 can store system software, image information, device information, document data, and the like.

An operation unit I/F 204 is an interface with an operation unit 134, and outputs, to the operation unit 134, image data to be displayed on the operation unit 134, and information of the image data. The operation unit I/F 204 transmits information input by the operator via the operation unit 134 to the CPU 200.

A network interface 205 is connected to the network (LAN) 140, and inputs/outputs information. A modem 206 is connected to the public line (WAN) 150, and inputs/outputs image information. These devices are arranged on a system bus 207.

An image bus I/F 208 is a bus bridge which connects the system bus 207 to an image bus 209 for transferring image data at high speed, and converts the data structure. The image bus 209 is formed from a PCI bus or IEEE1394. The following devices are arranged on the image bus 209.

A raster image processor (RIP) 210 rasterizes a PDL code into a bitmap image. A device I/F 211 connects the scanner 131 and printer 132 serving as image input and output devices to the controller unit 133 via an image input unit interface 212 and printing unit interface 213, respectively. The device I/F 211 performs synchronous/asynchronous conversion of image data. A scanner image processing unit 214 corrects, processes, and edits image data input from the scanner 131. The scanner image processing unit 214 has a function of determining, from an image data saturation signal, whether input image data represents a color or monochrome document, and holding the determination result. A printer image processing unit 215 corrects, processes, and edits image data output from the printer 132.

An image rotation unit 216 rotates an image and stores it in a memory at the same time as reading of an image from the scanner 131, in cooperation with the scanner image processing unit 214. The image rotation unit 216 can also rotate an image in the memory and store it in the memory, or print out an image in the memory in cooperation with the printer image processing unit 215 while rotating the image. An image compression unit 217 compresses/decompresses multilevel image data by JPEG or binary image data by JBIG, MMR, MR, MH, or the like. A resolution conversion unit 218 converts the resolution of image data in a memory, and stores the resultant image data in the memory. A color space conversion unit 219 converts, for example, a YUV image in the memory into a Lab image by matrix calculation, and stores the Lab image in the memory. A tone conversion unit 220 converts an 8-bit image of 256 levels in the memory into a 1-bit, 2-level image by a method such as error diffusion, and stores the 1-bit image in the memory. The image rotation unit 216, image compression unit 217, resolution conversion unit 218, color space conversion unit 219, and tone conversion unit 220 can be coupled to operate. For example, when performing image rotation and resolution conversion for an image in the memory, these two processes can be executed without the mediacy of the memory.

(Functional Configuration of System Software)

Figure 3:
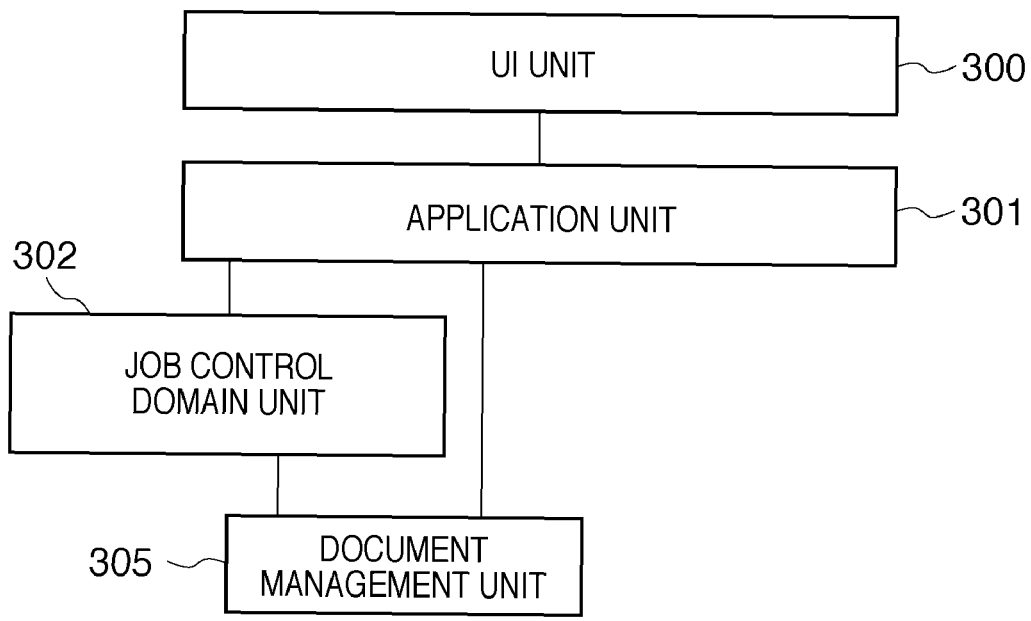
FIG. 3 is a block diagram showing the functional configuration of system software in the controller unit of the digital multi-function peripheral.

FIG. 3 is a block diagram showing the functional configuration of system software in the controller unit 133 of the digital multi-function peripheral shown in FIG. 2. A user interface (UI) unit 300 supplies input information from the operator to an application unit 301. Also, the user interface (UI) unit 300 receives the processing result from the application unit 301, and generates a window to be displayed on the operation unit 134. The application unit 301 performs processing in accordance with a request from the user interface (UI) unit 300. When scanning or printing is requested, the application unit 301 inputs a job to a job control domain unit 302 together with designated settings, and receives information such as the device state and job state from the job control domain unit 302. When reference to accumulated document data, editing of it, or the like is requested, the application unit 301 issues an acquisition instruction and change instruction to a document management unit 305, and receives information such as a document data list, document data attributes, and the like from the document management unit 305. The job control domain unit 302 controls the processes of a plurality of jobs including a scan job, copy job, print job, and FAX job. The document management unit 305 can manage image data as document data.

In the HDD 203, system software and image data are stored in the hard disk. However, the data are not limited to them, and general data files other than image data, such as data for managing image data, can also be stored. This function is called a box in the image forming apparatus. A folder can be created in the hard disk to store image data files and general data files. The folder is formed from an area only the system can internally access, and an area the user can access. The user can store image data and the like in a folder in the accessible area, and can refer to, edit, delete, and output a stored image.

Figure 4:
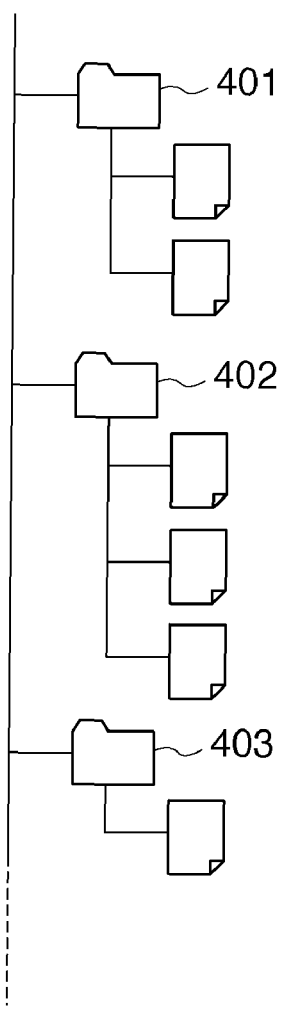
FIG. 4 is a view showing an example of a folder in an area accessible by the user.

FIG. 4 is a view showing an example of a folder in an area accessible by the user. For example, FIG. 4 shows three folders 401, 402, and 403, which store two data, three data, and one data, respectively. Needless to say, the number of folders is not limited to three, and folders can also be structured hierarchically. As a method of storing data in a folder, image data obtained by scanning an image by the scanner 131 is stored. Also, image data can be generated from an application document by a client computer connected to the image forming apparatus by using a printer driver, and stored in a folder.

The client computer may also directly access a folder by using the FTP, SMB, or WebDAV protocol or the like, and store an image or data other than an image in the folder. The user can check folders and stored image data on the operation unit 134. Image data is handled as document data under the management of system software. When there is a plurality of folders or document data, the operation unit 134 displays a list of folders or document data. The user can select desired document data from the document data list and designate an operation to the selected document data. Based on a user instruction, the selected document data undergoes processing such as display of a preview, display of properties, page insertion, move/copy to another folder, deletion of a document, or printing.

(Outline of Application Workflow Processing)

An outline of application form processing (application workflow) will be explained as an example of document data processing (workflow).

Figure 5:
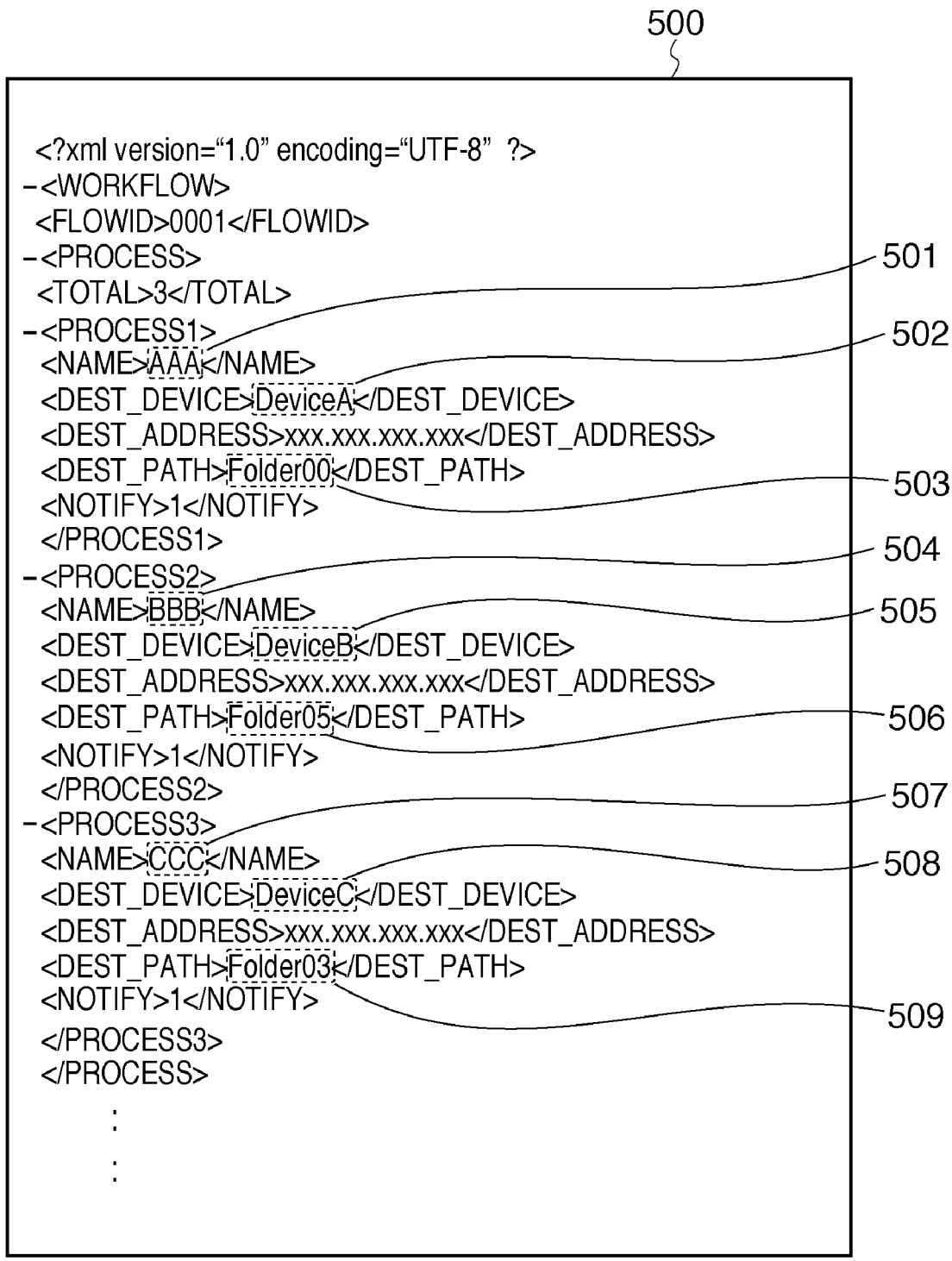
FIG. 5 is a view showing an example of workflow setting information.

The application workflow is executed in accordance with workflow setting information set in advance in a digital multi-function peripheral. FIG. 5 is a view showing an example of workflow setting information. Workflow setting information 500 describes identification information FLOW ID for identifying a workflow, information TOTAL representing the number of processes, the order to execute processes, document data destination addresses, and the like. The workflow system is stored in the HDD 203. In the example of FIG. 5, approval of document data is completed by three approval processes. The applicant executes an application workflow associated with selected document data. Then, the document data is transmitted to a "Folder 00" 503 of a Device A 502 for approval processing by an approver AAA 501. The document data stored in the "Folder 00" 503 of the Device A 502 is output in accordance with an instruction from the approver AAA 501, and the document data approved by the approver AAA 501 is scan-input by the scanner 131. In accordance with the workflow setting information, the scan-input document data is transmitted to a "Folder 05" 506 of a Device B 505 for approval processing by an approver BBB 504.

The document data stored in the "Folder 05" 506 of the Device B 505 is output in accordance with an instruction from the approver BBB 504, and the document data approved by the approver BBB 504 is scan-input by the scanner 131. In accordance with the workflow setting information, the scan-input document data is transmitted to a "Folder 03" 509 of a Device C 508 for approval processing by an approver CCC 507.

The workflow setting information shown in FIG. 5 is merely an example, and another description and another format are also available as long as information implements a workflow. The HDD 203 can also hold pieces of workflow setting information with different settings.

(Examples of Document Management Table and Job Log Table)

Figure 6:
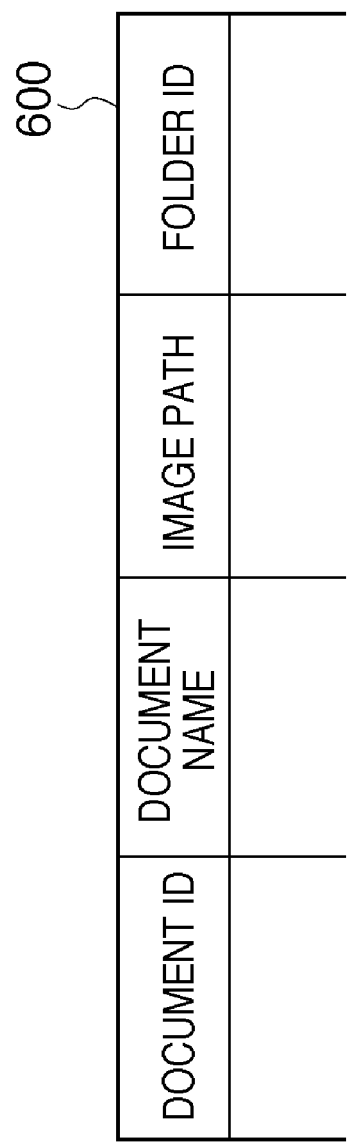
FIG. 6 is a table showing a definition example of a document management table.

FIG. 6 is a table showing a definition example of a document management table saved in the HDD 203. The document management table is formed from document data identification information (document ID) for identifying document data, a document name, an image path representing an image data save location, and a parent folder ID which stores the document data.

Figure 7:
FIG. 7 is a table showing a definition example of a job log table.

FIG. 7 is a table showing a definition example of a job log table saved in the HDD 203. The job log table includes, as building elements, a job ID for identifying a job, and a document ID for identifying document data to undergo a job. The job log table also includes, as building elements, a job type such as a scan job, print job, or send job, a job execution time, the output destination of an output job, and a job status.

(Application Workflow Processing)

Figure 8:
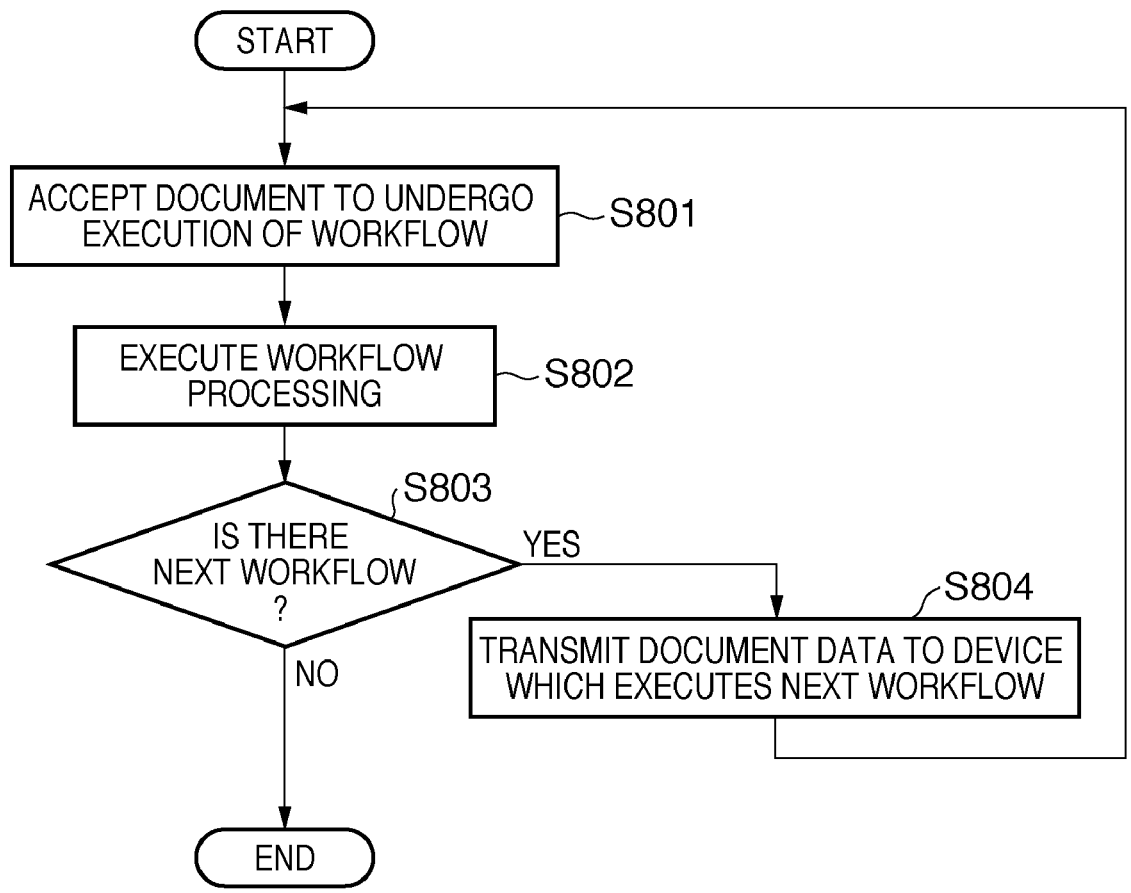
FIG. 8 is a flowchart for explaining basic processing of an application workflow.

FIG. 8 is a flowchart for explaining basic processing of the application workflow. The processing in this flowchart is executed in a digital multi-function peripheral on the applicant side that transmits document data, and one on the approver side (document data receiving side) that approves an application. In S801, document data to undergo execution of the workflow is accepted. The digital multi-function peripheral on the applicant side accepts application document data in accordance with an application start instruction from the operation unit 134. For example, when the applicant selects document data input by the scanner 131 or document data stored in advance in the HDD 203, the digital multi-function peripheral on the applicant side accepts the document data to be processed. The digital multi-function peripheral on the approver side receives document data transmitted from the digital multi-function peripheral on the applicant side or a preceding digital multi-function peripheral on the approver side, thereby accepting the document data to be processed.

In S802, processing of the document data is executed under the control of the CPU 200 of the digital multi-function peripheral.

In S803, after executing the processing, the CPU 200 of the digital multi-function peripheral determines, based on workflow setting information, whether there is a next workflow.

If there is a next workflow (YES in S803), the CPU 200 of the digital multi-function peripheral transmits the document data to a digital multi-function peripheral which is to execute the next workflow. Then, the process returns to S801.

The document data transmitted in the processing of S804 is processed by the digital multi-function peripheral which executes the next workflow. This processing is the same as that in S801 and subsequent steps. If the CPU 200 of the digital multi-function peripheral determines in S803 that there is no next workflow (NO in S803), the process ends.

Figure 9:
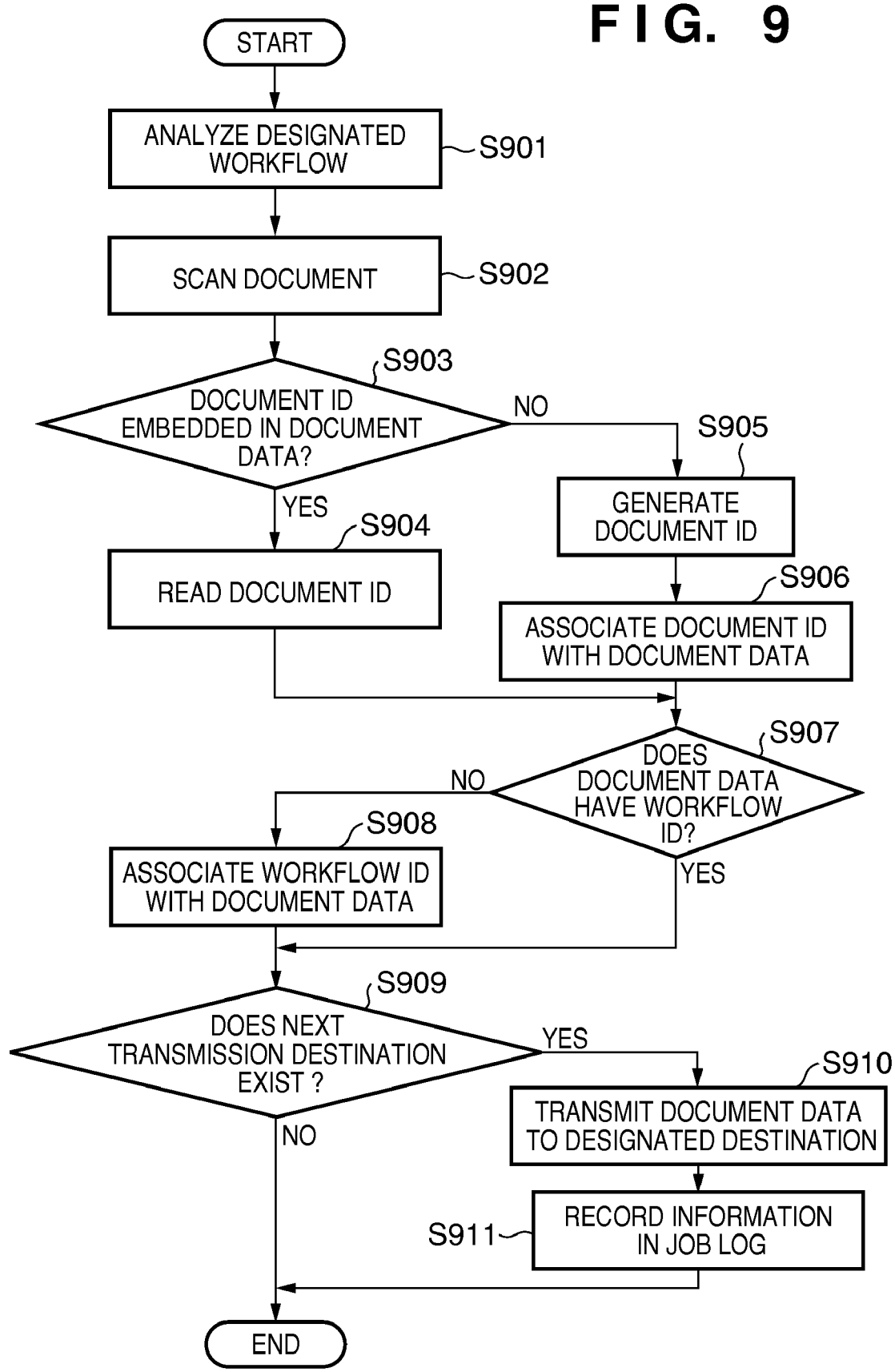
FIG. 9 is a flowchart for explaining workflow processing on the transmitting side.
Figure 10:
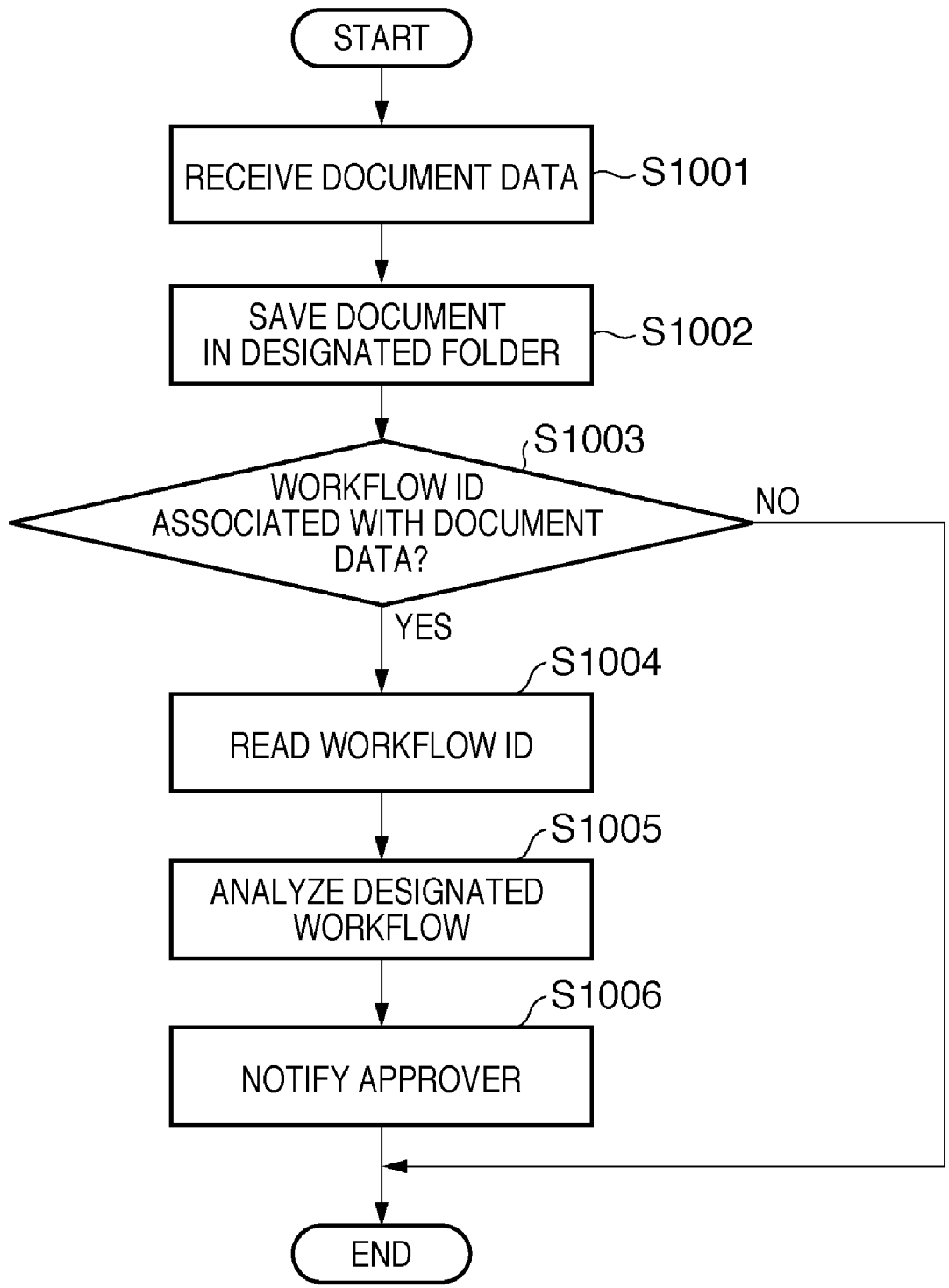
FIG. 10 is a flowchart for explaining workflow processing in a receiving digital multi-function peripheral.

A concrete sequence of the workflow processing will be explained separately on the document data transmitting side (FIG. 9) and the document data receiving side (FIG. 10).

(Application Workflow (Workflow on Transmitting Side))

A concrete processing sequence of the application workflow on the transmitting side will be explained with reference to the flowchart of FIG. 9. FIG. 9 is a flowchart for explaining workflow processing on the transmitting side.

In S901, when the applicant selects a desired workflow on the operation unit 134, workflow setting information associated with the selected workflow is read out from the HDD 203 and analyzed under the control of the CPU 200. From the analysis result, the contents of processing to be executed for document data by the transmitting digital multi-function peripheral, and those of processing to be executed by another image forming apparatus, for example, a document data destination for receiving approval of document data, and a folder for storing document data are specified. In this case, the CPU 200 functions as an analysis unit adapted to analyze, based on a selected one of workflows, the contents of processing to be executed for document data by the transmitting digital multi-function peripheral, and those of processing to be executed by another image forming apparatus.

In S902, the document of an application form is scanned. This processing corresponds to document data acceptance processing on the applicant side in S801 of FIG. 8. Identification information (document ID) for uniquely specifying document data can be embedded in advance in scanned document data by an information embedding technique.

In S903, the CPU 200 determines whether the document ID is embedded in the document data. If the document ID is embedded in the document data (YES in S903), the process advances to S904.

In S904, the document ID embedded in the document data is read under the control of the CPU 200.

If the CPU 200 determines in S903 that no document ID is embedded in the document data (NO in S903), the process advances to S905 to generate a document ID (S905). As an example of the document ID, information which is expressed by a UUID and can uniquely specify document data is available. In S906, the document ID generated in preceding step S905 is associated with the document data scanned in S902.

In S907, the CPU 200 determines whether the document data has a workflow ID for identifying designated workflow information, and a processing number for executing the next processing in the workflow. If the document data does not have a workflow ID (NO in S907), the process advances to S908. The CPU 200 combines a workflow ID corresponding to the designated workflow information with the document data scanned in S902, associating the workflow information with the document data.

If the CPU 200 determines in S907 that the document data has a workflow ID (YES in S907), the process advances to S909.

Processing specified based on the workflow information analysis result is executed for the document data under the control of the CPU 200 of the transmitting digital multi-function peripheral.

In S909, the CPU 200 refers to workflow setting information specified based on the workflow ID associated in S908 or the workflow ID determined in S907 to exist in the document data. Based on the workflow setting information, the CPU 200 determines whether a next transmission destination exists. This processing corresponds to S803 in FIG. 8. If a next transmission destination exists (YES in S909), the document data associated with the document ID and workflow ID is transmitted in S910 to the destination designated in the workflow setting information under the control of the CPU 200. This processing corresponds to S804 in FIG. 8.

In S911, the information (including the document data and information on the destination digital multi-function peripheral) transmitted in S910 is stored as log information (to be also referred to as a job log hereinafter) in the HDD 203. Then, the process ends. If the CPU 200 determines in S909 that there is no next transmission destination (NO in S909), the process ends. In this case, the CPU 200 of the transmitting digital multi-function peripheral functions as a log information management unit adapted to store information on another destination digital multi-function peripheral as log information in the HDD 203, and manage it.

(Application Workflow (Workflow on Receiving Side))

Workflow processing in a digital multi-function peripheral upon receiving document data of an application form will be explained. FIG. 10 is a flowchart for explaining workflow processing in a receiving digital multi-function peripheral.

The CPU 200 of the receiving digital multi-function peripheral receives document data of an application form in S1001, and saves the document data in a folder designated on the transmitting side in S1002.

In S1003, the CPU 200 of the receiving digital multi-function peripheral determines whether the document data is associated with a workflow ID. If the document data is associated with a workflow ID (YES in S1003), the CPU 200 determines that the document data is to undergo workflow processing, and reads out the workflow ID associated with the document data (S1004).

In S1005, the CPU 200 of the receiving digital multi-function peripheral reads out workflow information corresponding to the workflow ID from the HDD 203, and analyzes it. In S1006, in accordance with the analysis result, the CPU 200 notifies, of a processing request, an approver who is to execute workflow processing. The display (notification unit) of the operation unit 134 displays the reception of document data to be processed in accordance with workflow designation. As an example of the unit for notifying a processing request, e-mail or the like can be sent to a requested approver.

The display (notification unit) of the operation unit 134 displays an e-mail reception result to notify the approver of it. In this case, e-mail is sent by specifying a destination e-mail address from the address book of e-mail associated with an approver name. Upon receiving document data to be approved, the requested approver performs approval processing. The approval processing starts when the approver outputs, onto a paper medium, document data saved in a designated folder. The approver performs approval processing for the paper medium. After the end of the approval processing, the approver performs scan processing in order to execute the next workflow processing. This processing corresponds to acceptance processing in S801 of FIG. 8. When the workflow information designates transmission of document data to the next device, the document data is transmitted to the next destination.

If the document data is not associated with a workflow ID in S1003 (NO in S1003), the CPU 200 determines that the document data is not to undergo workflow processing. Then, the process ends.

(Cancellation Processing)

Figure 11:
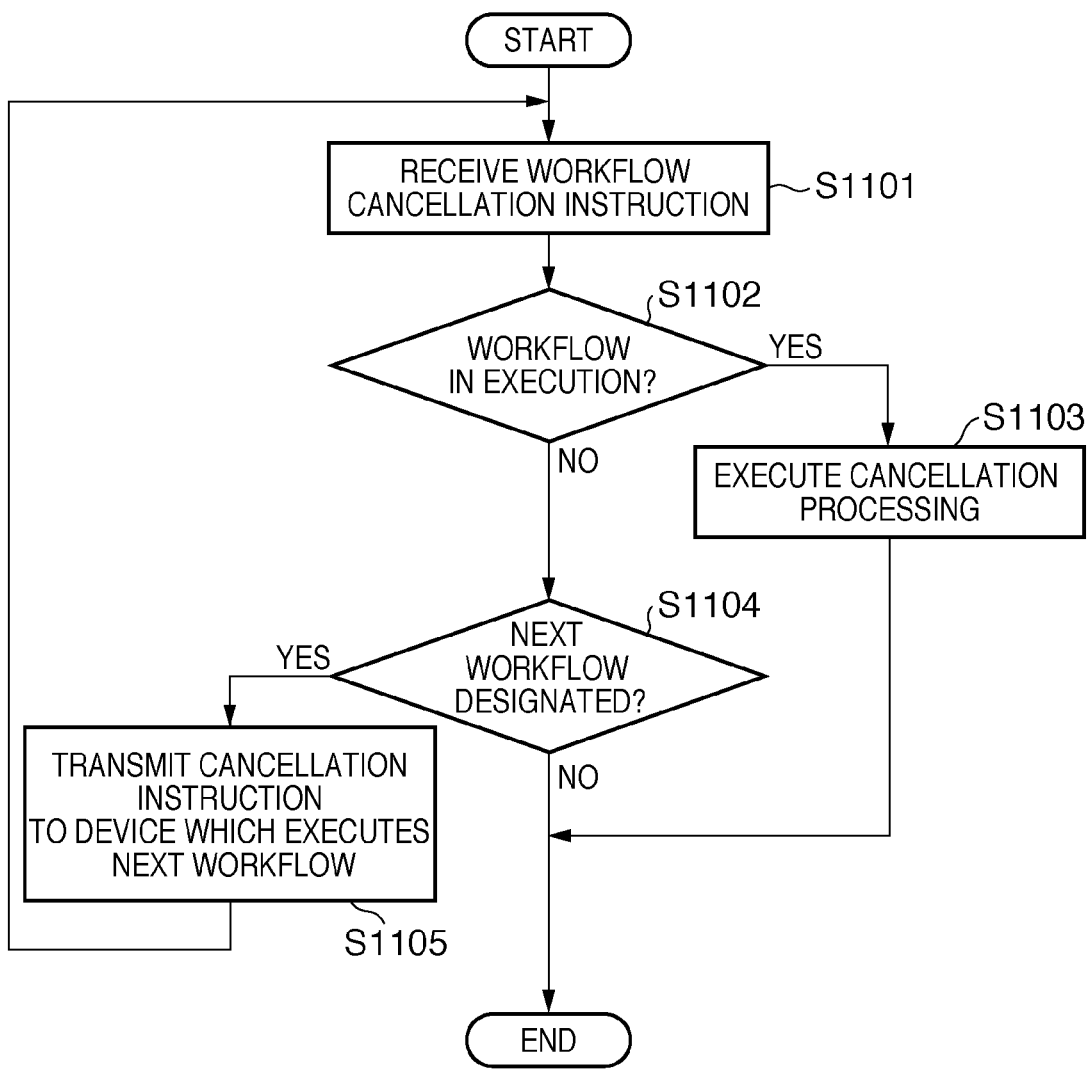
FIG. 11 is a flowchart for explaining basic processing for canceling workflow processing.

Processing when the applicant designates cancellation of workflow processing will be explained. FIG. 11 is a flowchart for explaining basic processing for canceling workflow processing. The processing in this flowchart is executed in digital multi-function peripherals on the document data transmitting and receiving sides.

In S1101, a workflow cancellation instruction is received. The digital multi-function peripheral on the applicant side accepts a cancellation instruction in accordance with an instruction from the operation unit 134. The digital multi-function peripheral on the approver side accepts a cancellation instruction transmitted from the digital multi-function peripheral on the applicant side or a preceding digital multi-function peripheral on the approver side.

In S1102, after accepting the cancellation instruction, the CPU 200 determines whether the target workflow is in execution. If the target workflow is in execution (YES in S1102), cancellation processing is executed under the control of the CPU 200 (S1103). Details of the cancellation processing will be explained with reference to FIG. 12, and a detailed description thereof will be omitted here.

If the CPU 200 determines in S1102 that the target workflow is not in execution (NO in S1102), it determines that the processing by the digital multi-function peripheral is complete. In S1104, the CPU 200 determines whether information of the workflow to be canceled designates the next processing. If the workflow information designates the next processing (YES in S1104), in S1105 a cancellation instruction is transmitted under the control of the CPU 200 to a digital multi-function peripheral which executes the next processing.

If the CPU 200 determines in S1104 that the workflow information does not designate the next processing (NO in S1104), the CPU 200 ends the process.

Figure 12:
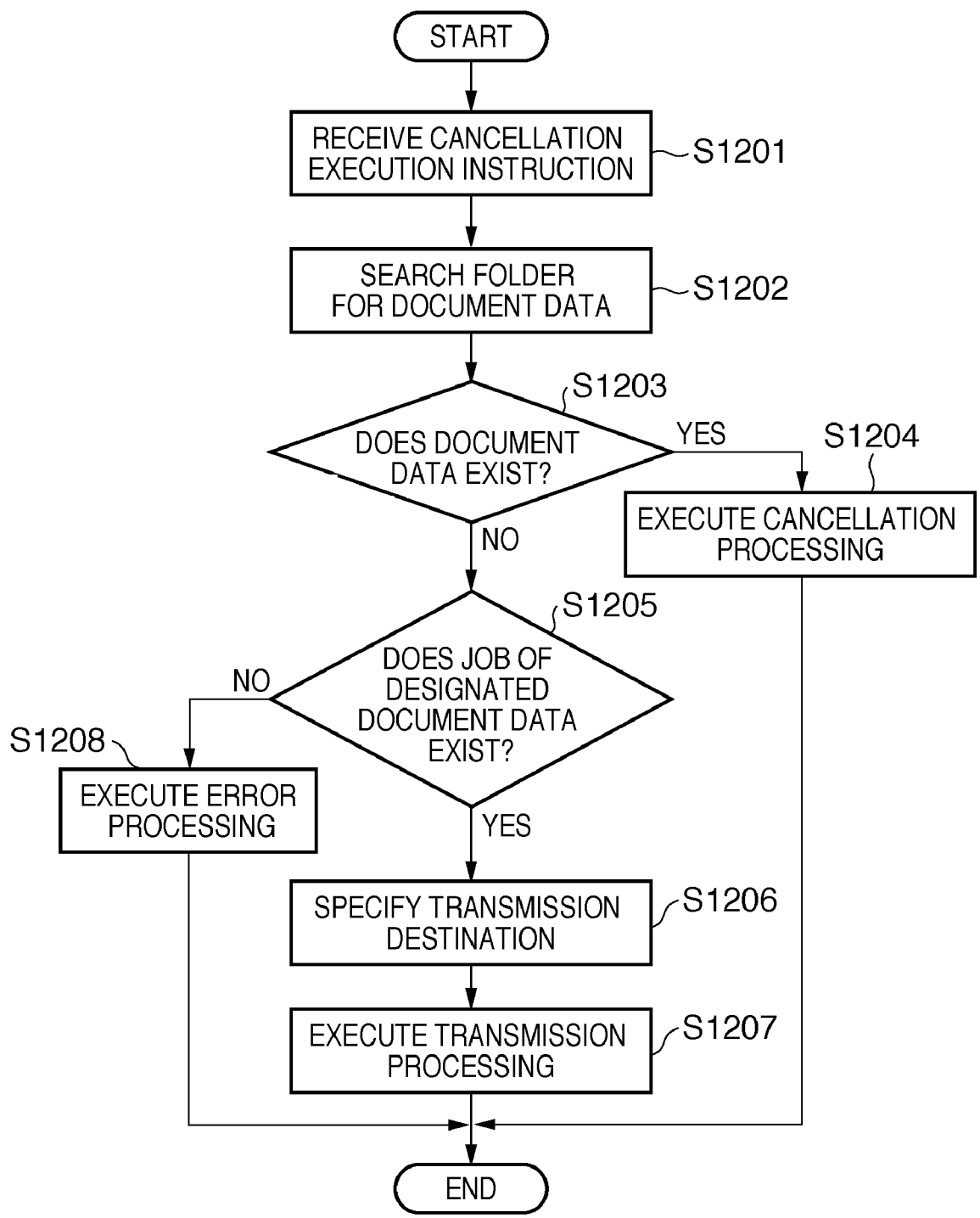
FIG. 12 is a flowchart for explaining in detail the contents of cancellation processing in S1103 of FIG. 11.

FIG. 12 is a flowchart for explaining in detail the contents of cancellation processing in S1103 of FIG. 11.

Upon receiving a workflow cancellation instruction in S1201, in S1202 search processing is executed to determine whether document data to undergo a workflow scheduled to be canceled exists in a designated folder. In this case, the search processing is done based on whether identification information of the document data coincides with identification information for identifying a workflow associated with the document data.

In S1203, the CPU 200 determines, based on the search result, whether document data to undergo the workflow scheduled to be canceled exists.

If such document data exists in the designated folder (YES in S1203), the CPU 200 determines that the workflow processing is in execution, and executes cancellation processing (S1204). The cancellation processing includes deletion of corresponding document data, and a cancellation receipt notification to the applicant.

If the CPU 200 determines in S1203 that no such document data exists (NO in S1203), it determines that the workflow processing by the self digital multi-function peripheral is complete. Then, the process advances to S1205.

In S1205, the CPU 200 searches a job log stored in the HDD 203 for a corresponding document data job. If a corresponding document data job exists as a result of the search (YES in S1205), the CPU 200 determines that the workflow processing has shifted to a digital multi-function peripheral which is to execute the next processing. Then, the CPU 200 specifies a transmission destination from the job log. In S1207, a cancellation instruction is transmitted to the digital multi-function peripheral specified in the processing of S1206 under the control of the CPU 200.

If no corresponding document data job exists in the job log (NO in S1205), error processing is done (S1208), and the process ends.

The first embodiment can build a system capable of canceling a workflow without arranging a server for managing processing of document data. The first embodiment can, therefore, reduce the cost of building a system and the burden of maintenance.

Only processing of document data to undergo a specific workflow can be canceled without stopping all the functions of devices which execute workflows. Thus, a plurality of workflows can be parallel-processed.

Second Embodiment (Cancellation Processing when Outputting Document)

The second embodiment will explain processing of deleting document data in a folder when the approver outputs a document onto a paper medium in workflow cancellation processing. Arrangements in the first embodiment are the same as those in FIGS. 1 to 7 in the first embodiment, and a description thereof will not be repeated. Workflow processing (FIG. 9) on the transmitting side and processing (FIG. 10) on the receiving side are also the same as those in the first embodiment, and a description thereof will not be repeated.

Figure 13:
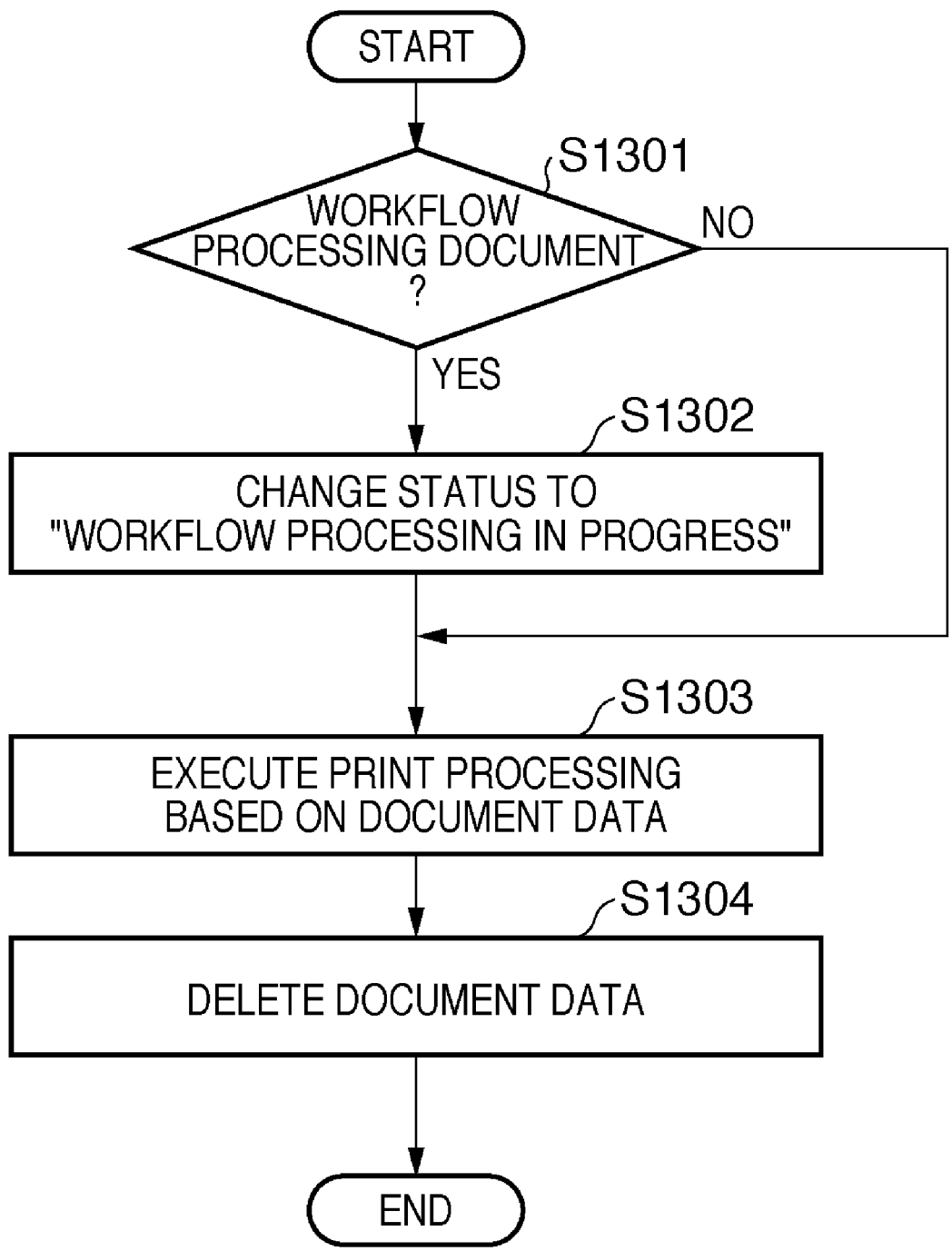
FIG. 13 is a flowchart for explaining application form output processing for approval.

FIG. 13 is a flowchart for explaining application form output processing for approval.

When the approver designates output of document data, a CPU 200 of a digital multi-function peripheral determines in S1301 whether a workflow ID is associated with the document data. If the workflow ID is associated (YES in S1301), that is, the document data is to undergo workflow processing, the CPU 200 changes the status in the job log to "workflow processing in progress" (S1302). If no workflow ID is associated (NO in S1301), that is, the document data is not to undergo workflow processing, print processing based on the document data is executed without changing the status in the job log (S1303). In S1304, the document data is deleted (S1304), and the process ends.

(Cancellation Processing During Output of Document)

Figure 14:
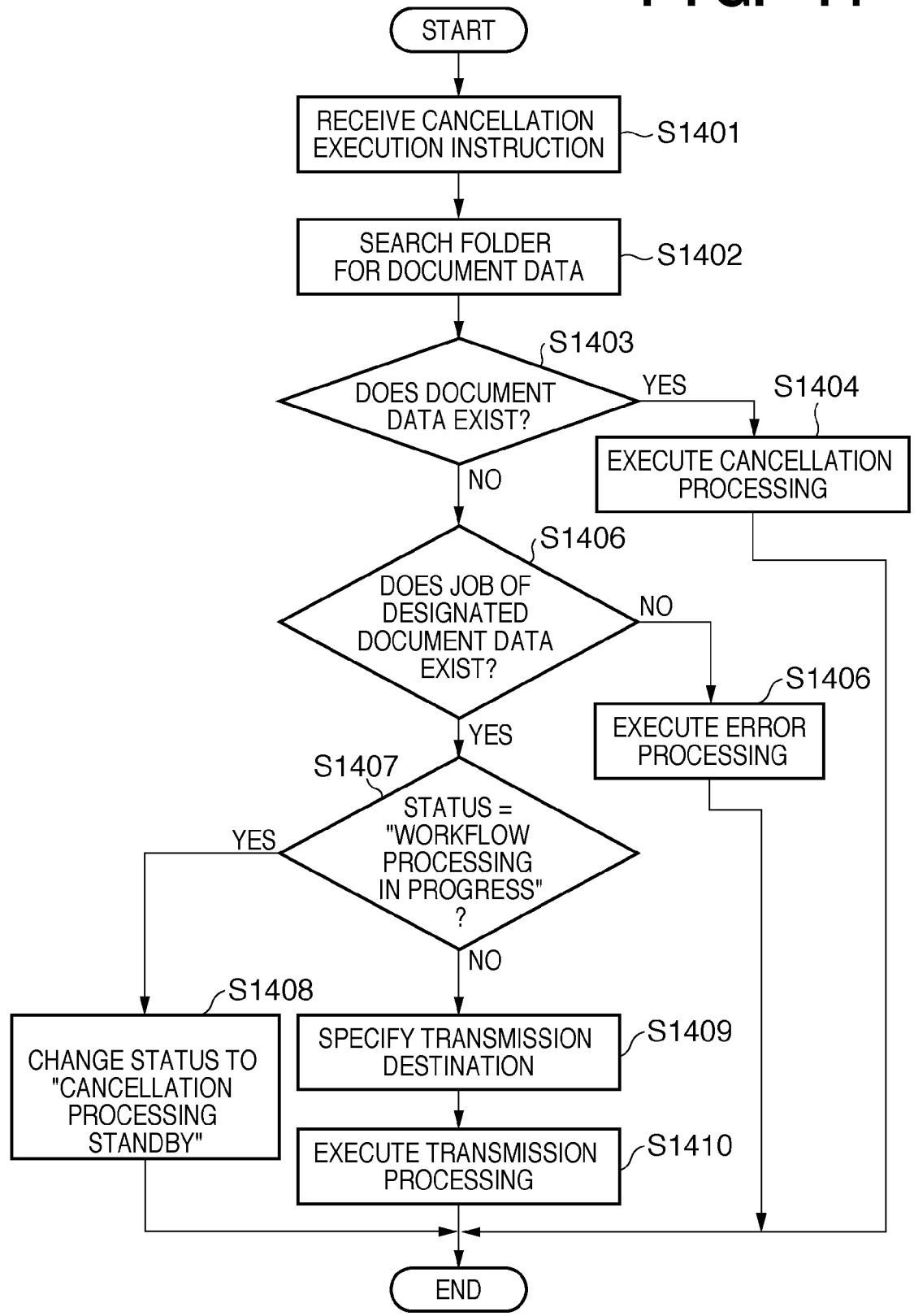
FIG. 14 is a flowchart for explaining processing upon receiving cancellation processing while the approver executes processing on a paper medium.

FIG. 14 is a flowchart for explaining processing upon receiving cancellation processing while the approver executes processing on a paper medium.

Upon receiving a workflow cancellation instruction in S1401, the CPU 200 searches in S1402 a designated folder for document data to undergo a workflow to be canceled. In S1403, the CPU 200 determines based on the search result whether such document data exists. If such document data exists (YES in S1403), the CPU 200 determines that the workflow processing is in execution, and executes cancellation processing (S1404). The cancellation processing includes deletion of a corresponding document, and a cancellation receipt notification to the applicant.

If no such document data exists (NO in S1403), the CPU 200 determines that the workflow processing is complete, and searches in S1405 the job log for a corresponding document data job. If a corresponding job exists as a result of the search (YES in S1405), the CPU 200 determines whether the status of the job is "workflow processing in progress" (S1407).

If the status is "workflow processing in progress" (YES in S1407), that is, the approver is outputting the document data onto a paper medium in the processing, the CPU 200 changes the status to "cancellation processing standby" (S1408).

If the CPU 200 determines in S1407 that the status is not "workflow processing in progress" (NO in S1407), it determines that the document data on the paper medium that has been processed by the approver has been transmitted to a destination digital multi-function peripheral which performs the next processing. In S1409, the CPU 200 specifies a transmission destination from the job log, and transmits a cancellation instruction to the specified transmission destination (S1410).

If the CPU 200 determines that no corresponding job exists in the job log (NO in S1405), the process advances to S1406, the CPU 200 executes error processing, and the process ends.

(Cancellation Processing after Outputting Document)

Figure 15A:
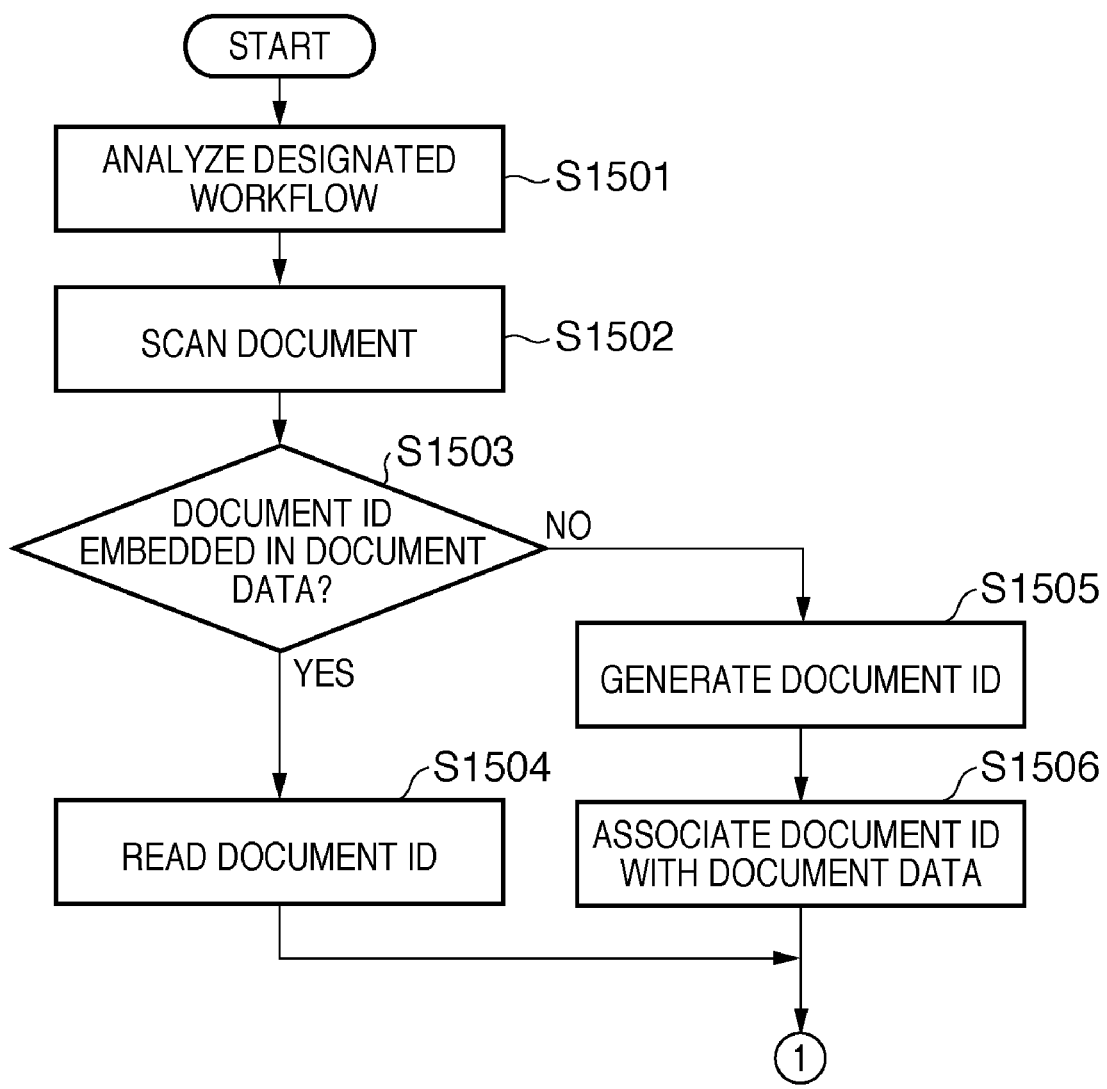
FIGS. 15A and 15B are flowcharts for explaining processing when, upon completion of processing on a paper medium, the approver transmits document data to a digital multi-function peripheral which executes next processing.
Figure 15B:
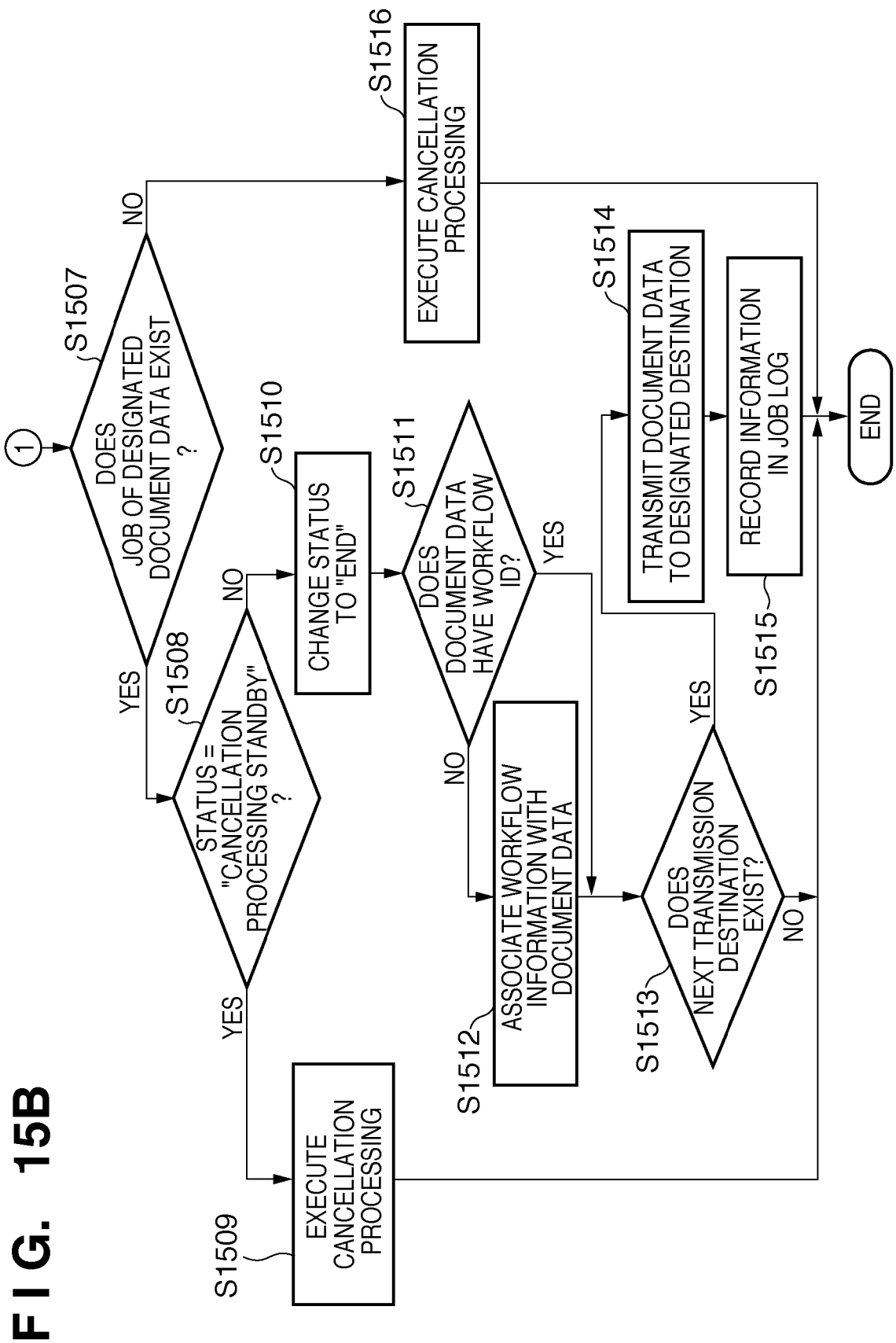

FIGS. 15A and 15B are flowcharts for explaining processing when, upon completion of processing on a paper medium, the approver transmits document data to a digital multi-function peripheral which executes next processing. When a desired workflow is selected on an operation unit 134, workflow information associated with the selected workflow is read out from an HDD 203 under the control of the CPU 200, and the readout workflow information is analyzed (S1501).

In S1502, an approved application form is scanned (document scanning). Identification information (document ID) for uniquely specifying a document can be embedded in advance in scanned document data by an information embedding technique.

In S1503, the CPU 200 determines whether the document ID is embedded in the document data. If the document ID is embedded in the document data (YES in S1503), the process advances to S1504.

In S1504, the document ID embedded in the document data is read under the control of the CPU 200.

If the CPU 200 determines in S1503 that no document ID is embedded in the document data (NO in S1503), the process advances to S1505 to generate a document ID (S1505). As an example of the document ID, information which is expressed by a UUID and can uniquely specify a document is available.

In S1506, the document ID generated in preceding step S1505 is associated with the document data scanned in S1502.

In S1507, the CPU 200 searches the job log for a corresponding document data job. If no corresponding document data job exists in the job log as a result of the search in S1507 (NO in S1507), the CPU 200 executes error processing (S1516), and the process ends.

If a corresponding job exists as a result of the search in S1507 (YES in S1507), the CPU 200 determines in S1508 whether the job status representing a corresponding document data processing status is "cancellation processing standby". If the status is "cancellation processing standby" (YES in S1508), that is, a cancellation instruction has been received while the approver outputs the document data onto a paper medium, the CPU 200 executes cancellation processing (S1509).

If the job status representing a corresponding document data processing status is not "cancellation processing standby" (NO in S1508), the CPU 200 determines that no cancellation instruction has been received while the approver outputs the document data onto a paper medium. Then, the CPU 200 changes the job status representing a corresponding document data processing status to "end" (S1510).

In S1511, the CPU 200 determines whether the document data has a workflow ID for identifying a workflow designated for the document data, and a processing number for executing the next processing in the workflow. If the document data does not have a workflow ID (NO in S1511), the process advances to S1512, and the CPU 200 associates a workflow ID corresponding to the designated workflow information with the document data scanned in S1502.

If the CPU 200 determines in S1511 that the document data has a document ID (YES in S1511), the process advances to S1513.

In S1513, the CPU 200 refers to workflow setting information specified based on the workflow ID associated in S1512 or the workflow ID in the document data that is determined in S1511 to exist. Based on the workflow setting information, the CPU 200 determines whether a next transmission destination exists. If a next transmission destination exists (YES in S1513), in S1514 the document data associated with the document ID and workflow ID is transmitted to the transmission destination designated in the workflow setting information under the control of the CPU 200.

In S1515, the information transmitted in S1514 is stored as a job log in the HDD 203, and the process ends.

The second embodiment can build a system capable of canceling a workflow without arranging a server for managing processing of document data. Hence, the second embodiment can reduce the cost of building a system and the burden of maintenance.

Only processing of document data to undergo a specific workflow can be canceled without stopping all the functions of devices which execute workflows. A plurality of workflows can be parallel-processed.

Third Embodiment

The third embodiment will explain a method of transmitting a cancellation instruction to cancel processing to be executed last in a workflow for executing processing using different functions of digital multi-function peripherals.

Arrangements in the third embodiment are the same as those in FIGS. 1 to 7 in the first embodiment, and a description thereof will not be repeated. Workflow processing (FIG. 9) on the transmitting side and processing (FIG. 10) on the receiving side are also the same as those in the first embodiment, and a description thereof will not be repeated.

FIG. 16 is a flowchart for explaining the sequence of processes in respective devices in a document processing system formed from digital multi-function peripheral A (device A), digital multi-function peripheral B (device B), and digital multi-function peripheral C (device C) as an example of the system configuration.

In the workflow according to the third embodiment, digital multi-function peripheral A (device A) scans document data and transmits it to digital multi-function peripheral B (device B) in S1601.

In S1602, digital multi-function peripheral B (device B) executes image processing, for example, text extraction processing by optical character recognition for the received document data, and transmits the processing result and document data to digital multi-function peripheral C (device C).

In S1603, digital multi-function peripheral C (device C) transmits the document data and text extraction result to a designated destination. To notify the completion of a series of processes, digital multi-function peripheral C (device C) sends e-mail to a designated address.

In FIG. 16, the document processing system is formed from three digital multi-function peripherals. However, the purport of the present invention is not limited to this example, and a workflow can also be executed by a combination of three or more digital multi-function peripherals.

(Transmission of Cancellation Instruction)

Figure 17:
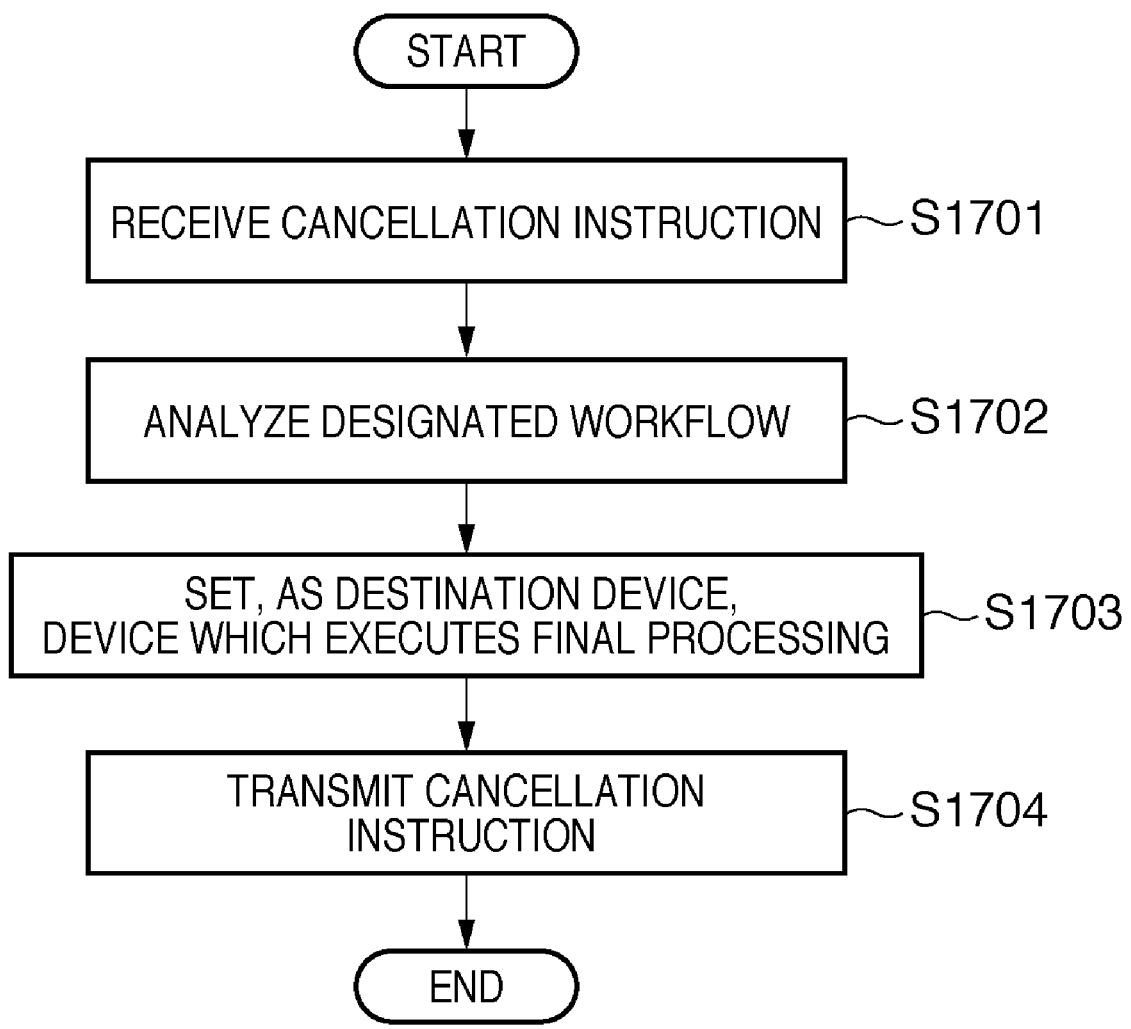
FIG. 17 is a flowchart for explaining the sequence of processing for transmitting a cancellation instruction to cancel processing to be executed last in the workflow shown in FIG. 16.

FIG. 17 is a flowchart for explaining the sequence of processing for transmitting a cancellation instruction to cancel processing to be executed last in the workflow shown in FIG. 16.

Upon receiving a cancellation processing instruction for a workflow in S1701 in response to an operation to an operation unit 134, information of the workflow, cancellation of which is designated, is read out from an HDD 203 and analyzed (S1702). The workflow to be canceled can be specified based on identification information for identifying a workflow. For example, when a cancellation instruction is input by an operation to the operation unit 134 of digital multi-function peripheral A (device A), a CPU 200 of device A reads out corresponding workflow information from the HDD 203 on the basis of identification information of the workflow designated by the cancellation instruction. The CPU 200 analyzes the contents of processing to be canceled, and a digital multi-function peripheral which executes the processing. The CPU 200 functions as a specifying unit adapted to specify, based on a workflow specified by a cancellation instruction, the contents of processing to undergo the cancellation instruction, and whether an image forming apparatus which executes the processing is the self image forming apparatus or another image forming apparatus.

In S1703, when canceling processing to be executed last in the workflow, the CPU 200 of device A specifies that processing (S1603 in FIG. 16) to be executed by digital multi-function peripheral C (device C) is to be canceled. Note that the cancellation processing instruction may be accepted not only by the operation unit 134 of digital multi-function peripheral A (device A), but also by the operation unit 134 of digital multi-function peripheral B (device B). When canceling processing to be executed last in the workflow, the CPU 200 of device B specifies that processing (S1603 in FIG. 16) to be executed by digital multi-function peripheral C (device C) is to be canceled.

In S1704, the CPU 200 of device A or B transmits a cancellation instruction to digital multi-function peripheral C (device C) specified in preceding step S1703.

The cancellation instruction includes a workflow ID, and identification information (document ID) for specifying document data to undergo workflow processing.

(Cancellation Instruction Reception Processing)

Figure 18:
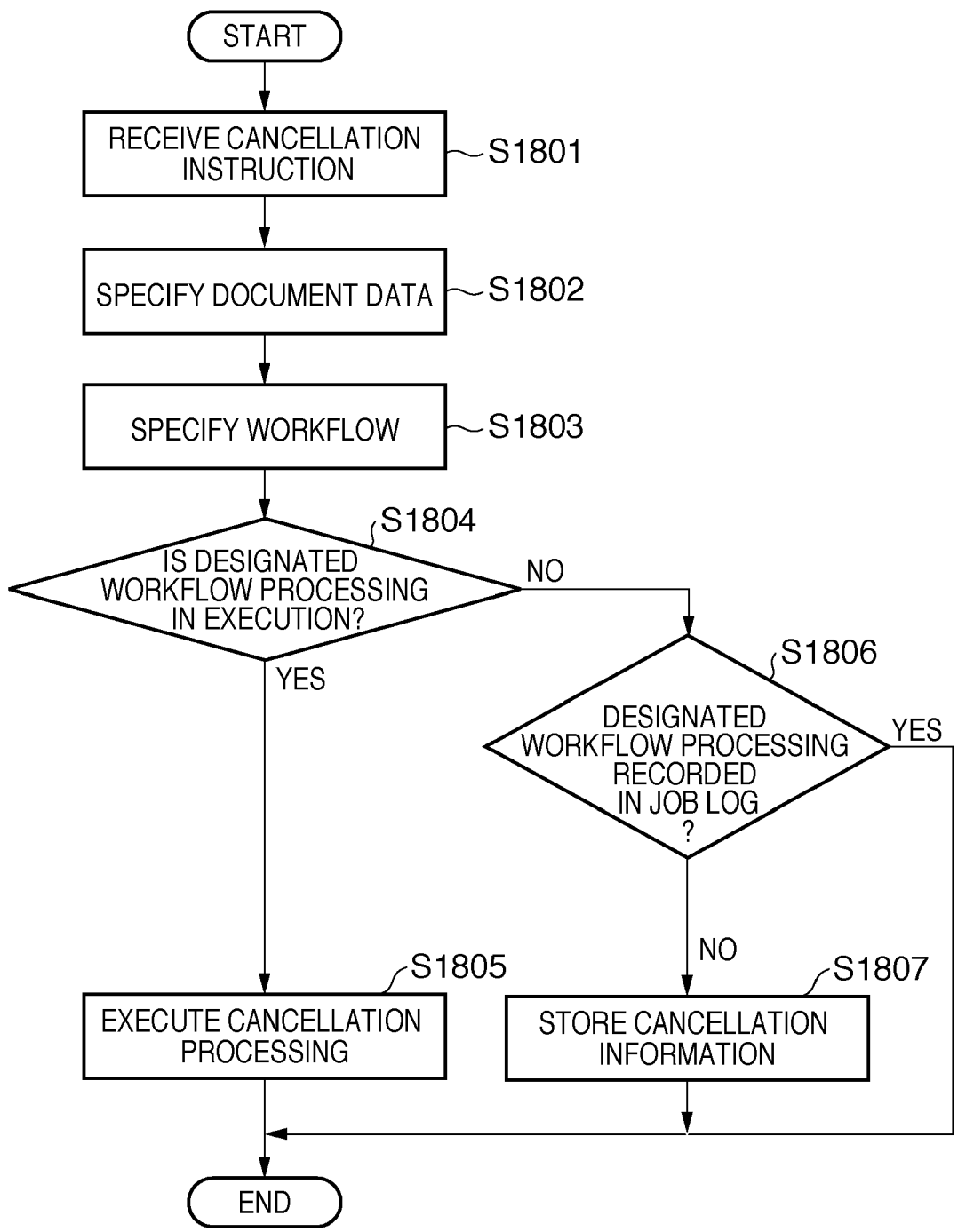
FIG. 18 is a flowchart for explaining the sequence of cancellation instruction reception processing.

FIG. 18 is a flowchart for explaining the sequence of cancellation instruction reception processing. A cancellation instruction transmitted from device A is transferred to device C by transmission processing by device B. A cancellation instruction transmitted from device B is transferred to device C.

Upon receiving a cancellation instruction in S1801, the CPU 200 of digital multi-function peripheral C (device C) specifies document data to undergo workflow processing from a document ID included in the cancellation instruction (S1802).

In S1803, the CPU 200 of digital multi-function peripheral C (device C) specifies a workflow to be canceled from a workflow ID included in the cancellation instruction.

In S1804, the CPU 200 of digital multi-function peripheral C (device C) determines whether the designated workflow is in execution. Based on the status representing a workflow processing status, the CPU 200 can determine whether the workflow is in execution.

If the designated workflow is in execution (YES in S1804), cancellation processing is executed in S1805 under the control of the CPU 200 of digital multi-function peripheral C (device C). If the CPU 200 determines in S1804 that the designated workflow is not in execution (NO in S1804), the process advances to S1806.

In S1806, in order to determine whether processing of the document data is complete, the CPU 200 of digital multi-function peripheral C (device C) refers to the job log to determine whether workflow processing of the corresponding document data has been executed. If the CPU 200 of digital multi-function peripheral C (device C) determines in S1806 that the corresponding job is recorded in the job log (YES in S1806), it determines that the processing of the document data is already complete, and the process ends.

If the CPU 200 of device C determines in S1806 that no corresponding job is recorded in the job log (NO in S1806), it determines that the processing of the document data is not complete, and stores cancellation instruction information (cancellation information) in the HDD 203. Then, the process ends (S1807). In this case, the CPU 200 functions as a cancellation instruction storage unit adapted to store received cancellation instruction information (cancellation information) in a storage unit.

(Cancellation Processing in Workflow)

Figure 19:
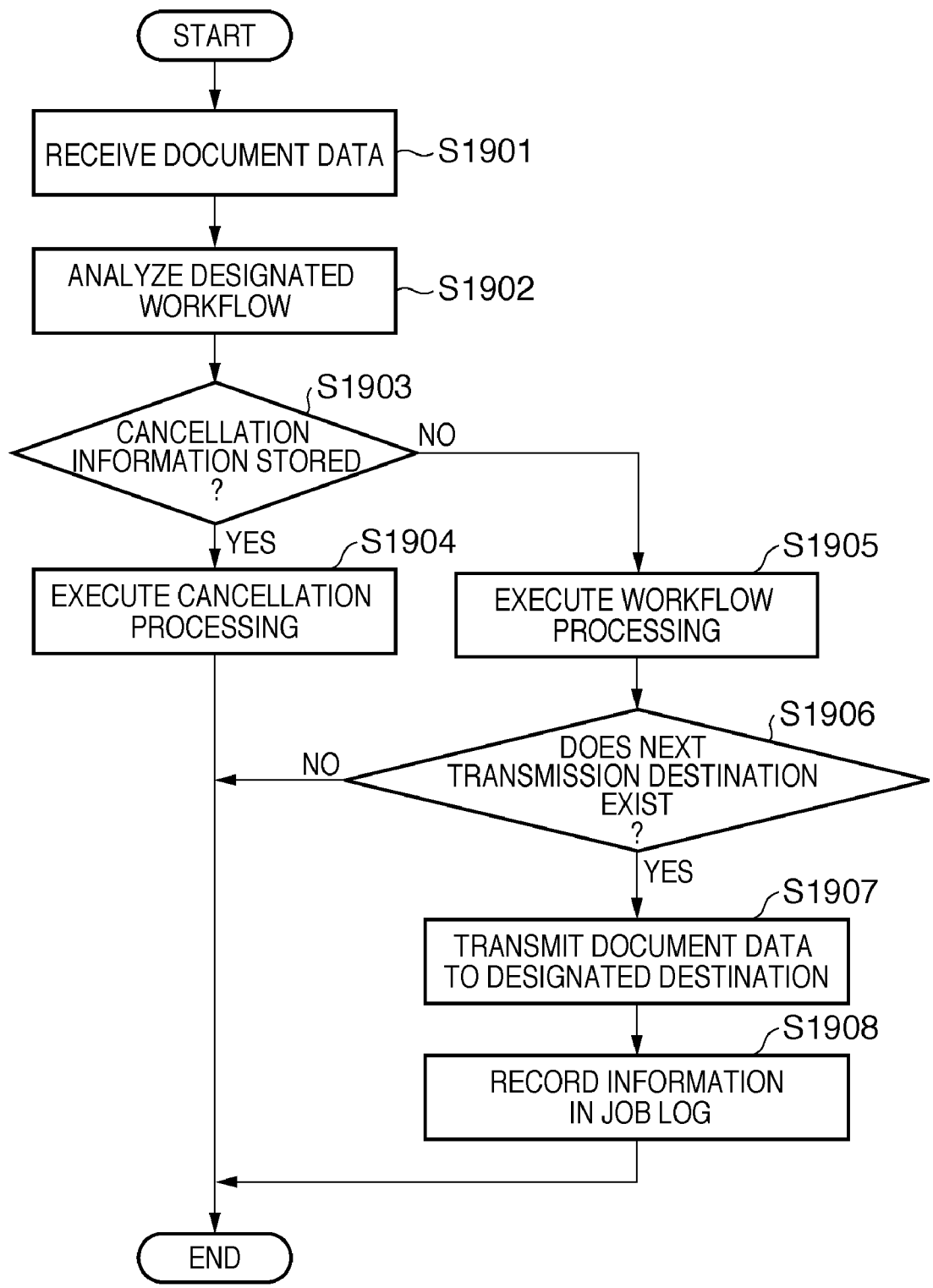
FIG. 19 is a flowchart for explaining the sequence of cancellation processing in a workflow.

FIG. 19 is a flowchart for explaining the sequence of cancellation processing in a workflow.

Upon receiving document data to undergo workflow processing in S1901, the CPU 200 of digital multi-function peripheral C reads out workflow information from the HDD 203, analyzes it, and prepares for workflow processing (S1902).

At this time, the CPU 200 of digital multi-function peripheral C determines whether cancellation information stored in S1807 of FIG. 18 is stored in the HDD 203 (S1903).

If the cancellation information is stored (YES in S1903), the CPU 200 of device C executes cancellation processing for the workflow processing (S1904). If no cancellation information is stored (NO in S1903), the CPU 200 of device C executes processing complying with the workflow information (S1905). Upon completion of the workflow processing in S1905, in S1906 the CPU 200 refers to the workflow information to determine whether the next transmission destination exists. If the CPU 200 determines in S1906 that no next transmission destination exists (NO in S1906), the process ends.

If the CPU 200 determines in S1906 determines that the next transmission destination exists (YES in S1906), it transmits document data associated with a document ID and workflow ID to the destination designated in the workflow information (S1907). In S1908, the CPU 200 stores, as a job log in the HDD 203, the information transmitted in preceding step S1907, and the process ends.

The third embodiment can build a system capable of canceling a workflow without arranging a server for managing processing of document data. Hence, the third embodiment can reduce the cost of building a system and the burden of maintenance.

Only processing of document data to undergo a specific workflow can be canceled without stopping all the functions of devices which execute workflows. A plurality of workflows can be parallel-processed.

Fourth Embodiment

The fourth embodiment will explain an example of specifying, as a cancellation instruction destination, a digital multi-function peripheral which externally outputs document data to undergo a workflow, and when no external output is designated, specifying a digital multi-function peripheral which executes the final processing in the workflow.

Arrangements in the fourth embodiment are the same as those in FIGS. 1 to 7 in the first embodiment, and a description thereof will not be repeated. Workflow processing (FIG. 9) on the transmitting side and processing (FIG. 10) on the receiving side are also the same as those in the first embodiment, and a description thereof will not be repeated.

Figure 20:
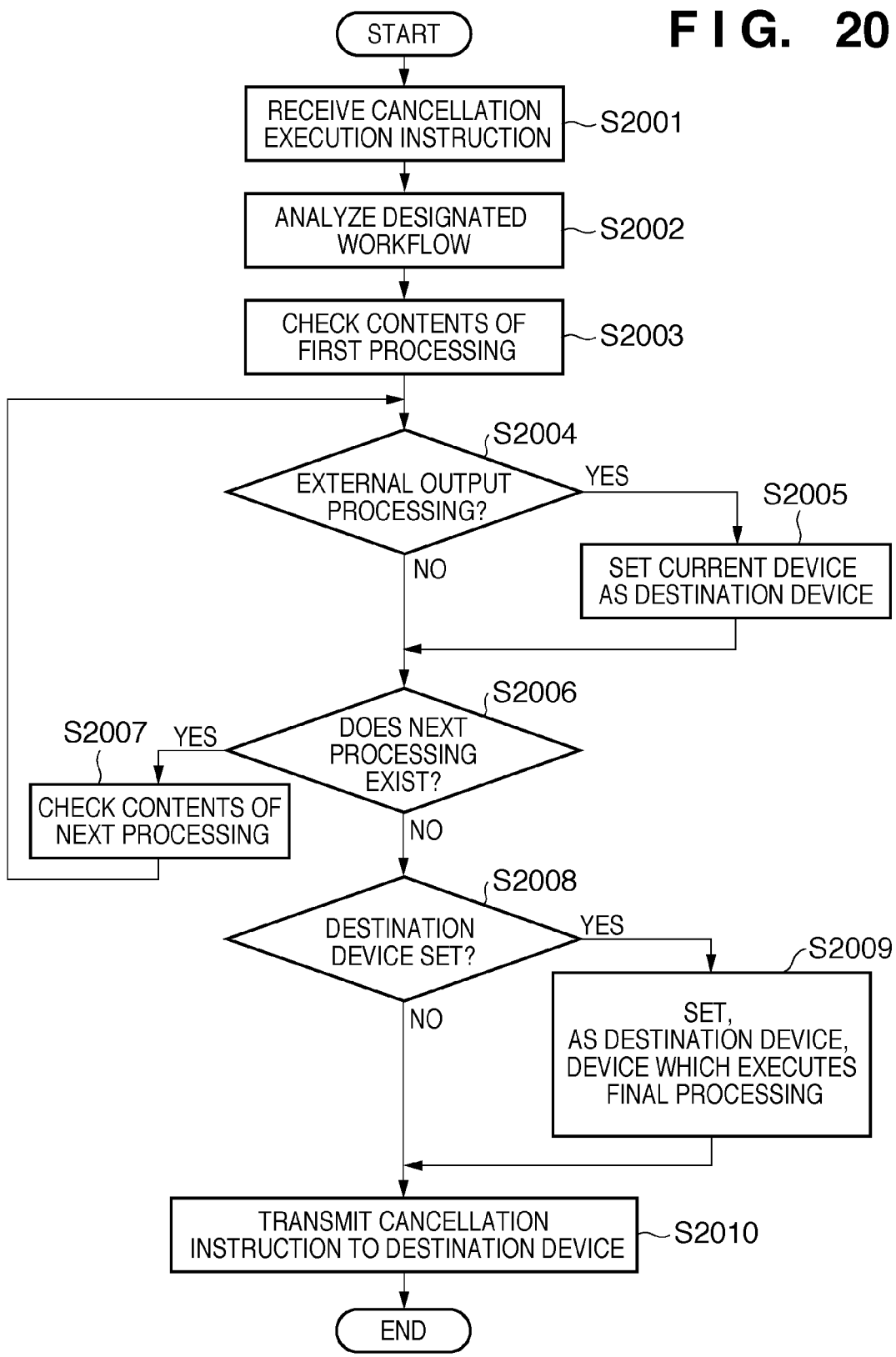
FIG. 20 is a flowchart for explaining the sequence of processing for specifying a destination to which a cancellation instruction is transmitted, and transmitting the cancellation instruction to the specified destination.

FIG. 20 is a flowchart for explaining the sequence of processing for specifying a destination to which a cancellation instruction is transmitted, and transmitting the cancellation instruction to the specified destination.

Upon receiving a cancellation processing instruction for a workflow in S2001 in response to an operation to an operation unit 134, information of the workflow, cancellation of which is designated, is read out from an HDD 203 and analyzed (S2002).

In S2003, a CPU 200 of a digital multi-function peripheral checks the contents of the first processing in the workflow information, and determines whether the processing contents represent external output processing of the digital multi-function peripheral (S2004).

If the workflow information designates the external output processing of the digital multi-function peripheral (YES in S2004), the CPU 200 stores the digital multi-function peripheral as a digital multi-function peripheral to which a cancellation instruction is to be transmitted (S2005).

In S2006, the CPU 200 determines whether next processing exists in the workflow information. If next processing exists (YES in S2006), the CPU 200 checks the contents of the next processing (S2007), and shifts to the processing in S2004.

If the CPU 200 determines in S2006 that no next processing exists (NO in S2006), the process advances to S2008. In S2008, the CPU 200 determines whether the digital multi-function peripheral to which a cancellation instruction is to be transmitted has been set. If no digital multi-function peripheral to which a cancellation instruction is to be transmitted has been set (NO in S2008), the CPU 200 sets, as the cancellation instruction destination, a digital multi-function peripheral which executes the final processing in the workflow (S2009). In S2010, the CPU 200 transmits a cancellation instruction to the digital multi-function peripheral set as the cancellation instruction destination. Then, the process ends.

In the fourth embodiment, a digital multi-function peripheral which externally outputs document data to undergo a workflow is specified as a cancellation instruction destination. When no external output is designated, a digital multi-function peripheral which executes the final processing in the workflow is specified.

However, the cancellation instruction destination specified is not limited to this example. Needless to say, the contents of processing executed by a digital multi-function peripheral which builds the document processing system, for example, the scanner function or BOX print function can also be designated.

It is also possible to prompt the operator to designate in advance processing to be canceled, and when designating cancellation, specify a digital multi-function peripheral which executes the processing designated in advance by the operator, and transmit a cancellation instruction.

In the arrangements of the first and second embodiments, cancellation processing is executed by tracking a digital multi-function peripheral during workflow processing. In the arrangements of the third and fourth embodiments, a cancellation instruction is transmitted by specifying in advance a digital multi-function peripheral.

The purport of the present invention is not limited to the arrangement of each embodiment, and the arrangements of the respective embodiments can also be combined. For example, the document processing system can also be configured to track a digital multi-function peripheral during workflow processing, also specify a digital multi-function peripheral, transmit cancellation instructions to them, and execute workflow cancellation processing in accordance with either cancellation instruction.

The fourth embodiment can build a system capable of canceling a workflow without arranging a server for managing processing of document data. The fourth embodiment can reduce the cost of building a system and the burden of maintenance.

Only processing of document data to undergo a specific workflow can be canceled without stopping all the functions of devices which execute workflows. A plurality of workflows can be parallel-processed.

Other Embodiments

The object of the present invention is also achieved by supplying a computer-readable storage medium which stores software program codes for implementing the functions of the above-described embodiments to a system or apparatus. The object of the present invention is also achieved by reading out and executing the program codes stored in the storage medium by the computer (or the CPU or MPU) of the system or apparatus.

In this case, the program codes read out from the storage medium implement the functions of the above-described embodiments, and the storage medium which stores the program codes constitutes the present invention.

The storage medium for supplying the program codes includes a flexible disk, hard disk, optical disk, magnetooptical disk, CD-ROM, CD-R, nonvolatile memory card, and ROM.

The functions of the above-described embodiments are implemented when the computer executes the readout program codes. Also, the present invention includes a case where an OS (Operating System) or the like running on the computer performs part or all of actual processing on the basis of the instructions of the program codes and thereby implements the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-026904, filed Feb. 6, 2008 which is hereby incorporated by reference herein in its entirety.

What is claimed is:

1. A document processing system in which a plurality of image forming apparatuses that are connected to a network, and communicate with each other by transmitting/receiving document data to/from each other, and execute processing of document data in accordance with a workflow that defines contents of processes to be executed by the respective image forming apparatuses, each image forming apparatus comprising:

an analysis unit adapted to analyze, for a workflow selected from a plurality of workflows stored in advance in a storage unit, a content of processing document data by the image forming apparatus and a content of processing document data by another image forming apparatus;

a reception unit adapted to receive document data and store the document data in the storage unit;

an association unit adapted to associate the workflow with the document data by combining identification information for identifying the selected workflow, and the document data;

an execution unit adapted to execute processing based on an analysis result of said analysis unit for the document data;

a transmission unit adapted to, when processing to be executed by another image forming apparatus is designated in the selected workflow as a result of analysis by said analysis unit, transmit the document data to the other image forming apparatus upon completion of processing the document data;

an acceptance unit adapted to accept a cancellation instruction for specifying and canceling processing of a workflow;

a determination unit adapted to determine, based on whether identification information of the workflow specified by the cancellation instruction coincides with identification information of the workflow associated with the document data stored in the storage unit, whether the processing of the workflow specified by the cancellation instruction is in execution by said execution unit;

a cancellation processing unit adapted to, when said determination unit determines that the processing of the workflow corresponding to the cancellation instruction is in execution, cancel the processing of the workflow; and a log information management unit adapted to store, as log information in the storage unit, the document data transmitted by said transmission unit and information of the other image forming apparatus serving as a destination of the document data, wherein when the processing of the workflow is not in execution and the content of the processing to be executed by the other image forming apparatus is designated in the selected workflow, said cancellation processing unit transmits the cancellation instruction to the other image forming apparatus specified based on the log information.

2. The system according to claim 1, wherein
said reception unit receives document data transmitted from a transmission unit of another image forming apparatus, and stores the document data in the storage unit, and
said analysis unit determines whether the document data is combined with identification information for identifying a workflow, and when the document data is combined with the identification information, notifies a notification unit that the document data to be processed in accordance with an instruction of the workflow has been received.

3. The system according to claim 1, further comprising a specifying unit adapted to specify, based on a workflow specified by the cancellation instruction, a content of processing to undergo the cancellation instruction, and whether an image forming apparatus which executes the processing is the self image forming apparatus or another image forming apparatus,
wherein said cancellation processing unit transmits the cancellation instruction to the other image forming apparatus specified by said specifying unit.

4. The system according to claim 3, wherein when the processing of the workflow specified by the cancellation instruction is not in execution in the other image forming apparatus specified by said specifying unit, and log information of the processing of the workflow is not stored, said cancellation processing unit of the other image forming apparatus stores the cancellation instruction in the storage unit.

5. The system according to claim 4, wherein
said analysis unit of the other image forming apparatus specified by said specifying unit determines whether identification information of a workflow combined with received document data coincides with identification information of the workflow specified by the cancellation instruction stored in the storage unit, and
when the pieces of identification information coincide with each other as a result of analysis by said analysis unit, said cancellation processing unit of the other image forming apparatus cancels processing of the document data.

6. A control method of controlling a document processing system in which a plurality of image forming apparatus that are connected to a network, and communicate with each other by transmitting/receiving document data to/from each other, and execute processing of document data in accordance with a workflow that defines contents of processes to be executed by the respective image forming apparatuses, the method comprising:
an analysis step of analyzing, for a workflow selected from a plurality of workflows stored in advance in a storage unit, a content of processing document data by an image forming apparatus and a content of processing document data by another image forming apparatus;
a reception step of receiving document data and storing the document data in the storage unit;
an association step of associating the workflow with the document data by combining identification information for identifying the selected workflow, and the document data;
an execution step of executing processing based on an analysis result of the analysis step for the document data;
a transmission step of, when processing to be executed by another image forming apparatus is designated in the selected workflow as a result of analysis in the analysis step, transmitting the document data to the other image forming apparatus upon completion of processing the document data;
an acceptance step of accepting a cancellation instruction for specifying and canceling processing of a workflow;
a determination step of determining, based on whether identification information of the workflow specified by the cancellation instruction coincides with identification information of the workflow associated with the document data stored in the storage unit, whether the processing of the workflow specified by the cancellation instruction is in execution in the execution step;
a cancellation processing step of, when the processing of the workflow corresponding to the cancellation instruction is determined in the determination step to be in execution, canceling the processing of the workflow; and
a log information management step of storing, as log information in the storage unit, the document data transmitted in the transmission step and information of the other image forming apparatus serving as a destination of the document data,
wherein in the cancellation processing step, when the processing of the workflow is not in execution and the content of the processing to be executed by the other image forming apparatus is designated in the selected workflow, the cancellation instruction is transmitted to the other image forming apparatus specified based on the log information.

7. The control method according to claim 6, wherein
in the reception step, document data transmitted by processing of a transmission step executed in another image forming apparatus is received, and the document data is stored in the storage unit, and
in the analysis step, whether the document data is combined with identification information for identifying a workflow is determined, and when the document data is combined with the identification information, a notification unit is notified that the document data to be processed in accordance with an instruction of the workflow has been received.

8. The control method according to claim 6, further comprising a specifying step of specifying, based on a workflow specified by the cancellation instruction, a content of processing to undergo the cancellation instruction, and whether an image forming apparatus which executes the processing is the self image forming apparatus or another image forming apparatus,
wherein in the cancellation processing step, the cancellation instruction is transmitted to the other image forming apparatus specified in the specifying step.

9. The control method according to claim 8, wherein when the processing of the workflow specified by the cancellation instruction is not in execution in the other image forming apparatus specified in the specifying step, and log information of the processing of the workflow is not stored, the cancellation instruction is stored in the storage unit in the cancellation processing step executed in the other image forming apparatus.

10. The control method according to claim 9, wherein
in the analysis step executed in the other image forming apparatus specified in the specifying step, whether identification information of a workflow combined with received document data coincides with identification information of the workflow specified by the cancellation instruction stored in the storage unit is determined, and when the pieces of identification information coincide with each other as a result of analysis in the analysis step, processing of the document data is canceled in the cancellation processing step executed in the other image forming apparatus.

11. A non-transitory computer-readable storage medium storing a program when executed by a processor to perform a control method of controlling a document processing system in which a plurality of image forming apparatuses that are connected to a network, and communicate with each other by transmitting/receiving document data to/from each other, and execute processing of document data in accordance with a workflow that defines contents of processes to be executed by the respective image forming apparatuses, the method comprising:

an analysis step of analyzing, for a workflow selected from a plurality of workflows stored in advance in a storage unit, a content of processing document data by an image forming apparatus and a content of processing document data by another image forming apparatus;

a reception step of receiving document data and storing the document data in the storage unit;

an association step of associating the workflow with the document data by combining identification information for identifying the selected workflow, and the document data;

an execution step of executing processing based on an analysis result of the analysis step for the document data;

a transmission step of, when processing to be executed by another image forming apparatus is designated in the selected workflow as a result of analysis in the analysis step, transmitting the document data to the other image forming apparatus upon completion of processing the document data;

an acceptance step of accepting a cancellation instruction for specifying and canceling processing of a workflow;

a determination step of determining, based on whether identification information of the workflow specified by the cancellation instruction coincides with identification information of the workflow associated with the document data stored in the storage unit, whether the processing of the workflow specified by the cancellation instruction is in execution in the execution step;

a cancellation processing step of, when the processing of the workflow corresponding to the cancellation instruction is determined in the determination step to be in execution, canceling the processing of the workflow; and a log information management step of storing, as log information in the storage unit, the document data transmitted in the transmission step and information of the other image forming apparatus serving as a destination of the document data, wherein in the cancellation processing step, when the processing of the workflow is not in execution and the content of the processing to be executed by the other image forming apparatus is designated in the selected workflow, the cancellation instruction is transmitted to the other image forming apparatus specified based on the log information.

* * * * *